(12) United States Patent
Cyrén et al.

(10) Patent No.: US 12,429,135 B2
(45) Date of Patent: Sep. 30, 2025

(54) ACTUATOR SYSTEM

(71) Applicant: Kongsberg Automotive Holling 2 AS, Kongsberg (NO)

(72) Inventors: Bengt Cyrén, Svanesund (SE); Jasmin Insanic, Jönköping (SE)

(73) Assignee: Kongsberg Automotive Holling 2 AS, Kongsberg (NO)

( * ) Notice: Subject to any disclaimer, the term of this patent is extended or adjusted under 35 U.S.C. 154(b) by 0 days.

(21) Appl. No.: 18/554,727

(22) PCT Filed: Oct. 21, 2021

(86) PCT No.: PCT/IB2021/059736
§ 371 (c)(1),
(2) Date: Oct. 10, 2023

(87) PCT Pub. No.: WO2022/219394
PCT Pub. Date: Oct. 20, 2022

(65) Prior Publication Data
US 2025/0075793 A1 Mar. 6, 2025

Related U.S. Application Data

(60) Provisional application No. 63/174,815, filed on Apr. 14, 2021.

(51) Int. Cl.
*F16H 63/32* (2006.01)
*F16D 23/12* (2006.01)
(Continued)

(52) U.S. Cl.
CPC .............. *F16H 63/32* (2013.01); *F16D 23/12* (2013.01); *F16H 63/304* (2013.01);
(Continued)

(58) Field of Classification Search
CPC ................... F16H 63/32; F16H 63/304; F16H 2063/3056; F16H 2063/325;
(Continued)

(56) References Cited

U.S. PATENT DOCUMENTS 3,242,759 A * 3/1966 Magg ...................... F16H 63/20
74/473.25
4,449,416 A 5/1984 Huitema
(Continued)

FOREIGN PATENT DOCUMENTS

BR 8706692 A 7/1988
CN 104235330 A 12/2014
(Continued)

OTHER PUBLICATIONS

Auto Tech Review, "Modular System for Electrical Drive Axles", vol. 4, Issue 2, Feb. 2015, 5 pages.
(Continued)

*Primary Examiner* — Victor L Macarthur
(74) *Attorney, Agent, or Firm* — Howard & Howard Attorneys PLLC

(57) ABSTRACT

The present teachings provide for an actuator system including a support; a drive system connected to the support; a shift fork operatively connected to the drive system and configured to move a distance defining a stroke length between a disengaged position and an engaged position, the shift fork having a cam follower; a cam assembly operatively connected with the drive system to move between a neutral position, and a shifted position, with a plurality of intermediate positions between the neutral and shifted positions, the shift fork being in the disengaged position when the cam assembly is in the neutral position, the cam assembly including: a cam having an aperture defining an interior surface; a hub housing disposed within the aperture of the
(Continued)

cam and connected to the drive system; and a biasing member disposed within the aperture and preloaded between an interior surface of the aperture and the hub housing.

19 Claims, 17 Drawing Sheets

(51) Int. Cl.
  *F16H 63/30* (2006.01)
  *F16D 23/14* (2006.01)
(52) U.S. Cl.
  CPC .. *F16D 2023/123* (2013.01); *F16D 2023/141* (2013.01); *F16H 2063/3056* (2013.01); *F16H 2063/325* (2013.01)
(58) Field of Classification Search
  CPC ......... F16H 2063/3089; F16H 61/0003; F16H 63/04; F16D 23/12; F16D 2023/123; F16D 2023/141
  See application file for complete search history.

(56) References Cited

U.S. PATENT DOCUMENTS

| | | | |
|---|---|---|---|
| 4,722,237 A | 2/1988 | McNinch, Jr. | |
| 4,745,822 A | 5/1988 | Trachman et al. | |
| 4,785,681 A | 11/1988 | Kuratsu et al. | |
| 5,408,898 A | 4/1995 | Steeby et al. | |
| 5,517,875 A | 5/1996 | Kim | |
| 5,802,916 A * | 9/1998 | Ebinger | F16H 63/30 |
| | | | 74/360 |
| 6,619,153 B2 | 9/2003 | Smith et al. | |
| 7,409,887 B2 | 8/2008 | Riegler et al. | |
| 7,694,598 B2 | 4/2010 | Kriebernegg et al. | |
| 7,841,253 B2 | 11/2010 | Uberti et al. | |
| 9,611,917 B2 | 4/2017 | Takahashi | |
| 10,500,952 B2 | 12/2019 | Wentz et al. | |
| 10,584,778 B2 | 3/2020 | Peterson et al. | |
| 10,851,880 B2 | 12/2020 | Peterson et al. | |
| 10,895,321 B2 | 1/2021 | Peterson et al. | |
| 11,105,412 B2 | 8/2021 | Chen et al. | |
| 11,767,903 B2 | 9/2023 | Wei | |
| 2007/0175286 A1 | 8/2007 | Oliveira et al. | |
| 2009/0229392 A1 | 9/2009 | Kim et al. | |
| 2009/0277296 A1 | 11/2009 | Englund et al. | |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |

FOREIGN PATENT DOCUMENTS

| | | |
|---|---|---|
| DE | 3706386 A1 | 9/1988 |
| DE | 102014224366 A1 | 6/2016 |
| EP | 0600620 A1 | 6/1994 |
| EP | 0620388 A1 | 10/1994 |
| EP | 0695892 A2 | 2/1996 |
| EP | 0756113 A1 | 1/1997 |
| EP | 1118803 A2 | 7/2001 |
| EP | 809049 B1 | 10/2001 |
| EP | 2116746 A1 | 11/2009 |
| EP | 2886911 A1 | 6/2015 |
| EP | 3219190 B1 | 9/2019 |
| GB | 2153479 A | 8/1985 |
| JP | S 63-38721 | 2/1988 |
| JP | S6338721 A | 2/1988 |
| JP | H 08-4897 A | 1/1996 |
| JP | 5666860 B2 | 2/2015 |
| KR | 20050120954 A | 12/2005 |
| KR | 100566622 B1 | 3/2006 |
| KR | 101496558 B1 | 2/2015 |
| KR | 101610510 B1 | 4/2016 |
| WO | 2018217546 A1 | 11/2018 |
| WO | 2021168663 A1 | 9/2021 |

OTHER PUBLICATIONS

Computer-generated English language translation for KR 100566622 B1 extracted from espacenet.com database on Oct. 11, 2023, 7 pages.
Computer-generated English language translation for KR 20050120954 A extracted from espacenet.com database on Oct. 11, 2023, 5 pages.
EBAY, "Toyota Genuine Solenoid Vacuum Differential Actuator 4WD Front 41400-35034," https://www.ebay.com/itm/285055070076, 1995-2023, 5 pages.
English language abstract for DE 37 06 386 A1 extracted from espacenet.com database on Oct. 11, 2023, 1 page.
English language abstract for EP 1 118 803 A2 extracted from espacenet.com database on Oct. 11, 2023, 1 page.
English language abstract for JP 5666860 B2 extracted from espacenet.com database on Oct. 11, 2023, 2 pages.
English language abstract for JPS 63-38721 A extracted from espacenet. com database on Oct. 11, 2023, 1 page.
English language abstract for KR 101496558 B1 extracted from espacenet.com database on Oct. 11, 2023, 1 page.
English language abstract for KR 101610510 B1 extracted from espacenet.com database on Oct. 11, 2023, 1 page.
International Search Report for Application No. PCT/IB2021/059718 dated Jan. 25, 2022, 3 pages.
International Search Report for Application No. PCT/IB2021/059736 dated Feb. 23, 2022, 3 pages.
Luk Group, "7th Luk Symposium—Chapter 15: Electro-Mechanical Actuators", Apr. 2002, 15 pages.
Machine-assisted English language abstract for DE 10 2014 224 366 A1 extracted from espacenet.com database on Oct. 11, 2023, 4 pages.
Schaeffler Group, "Press Releases Webpage", https://www.schaeffler.com/en/media/press-releases/?filter=language%3A167&page=1, 2020, 3 pages.
U.S. Appl. No. 18/554,740, filed Oct. 10, 2023.
English language abstract for BR 8706692 A extracted from espacenet.com database on Aug. 22, 2024, 2 pages.
English language abstract for CN 104235330 A extracted from espacenet.com database on Aug. 22, 2024, 1 page.
English language abstract for JPH 08-4897 A extracted from espacenet.com database on Aug. 22, 2024, 2 pages.

\* cited by examiner

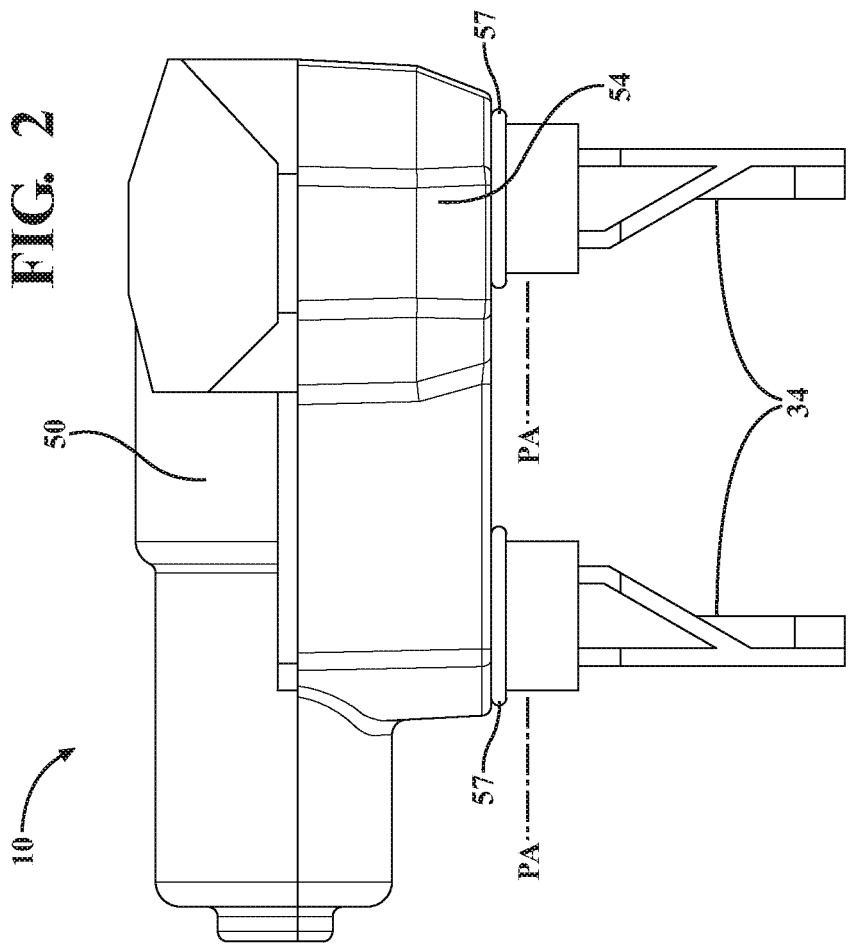
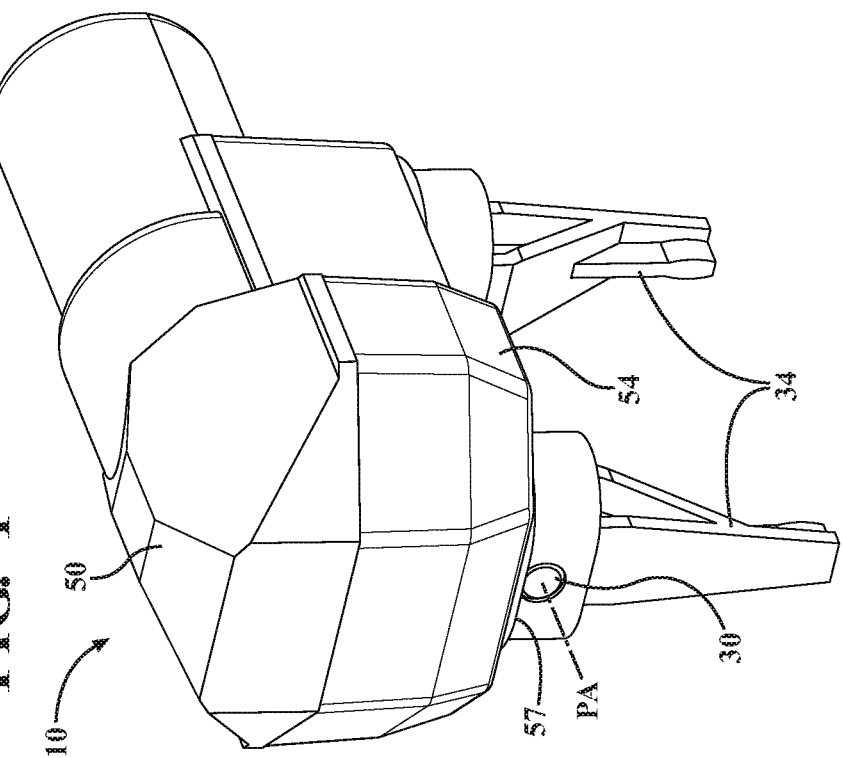

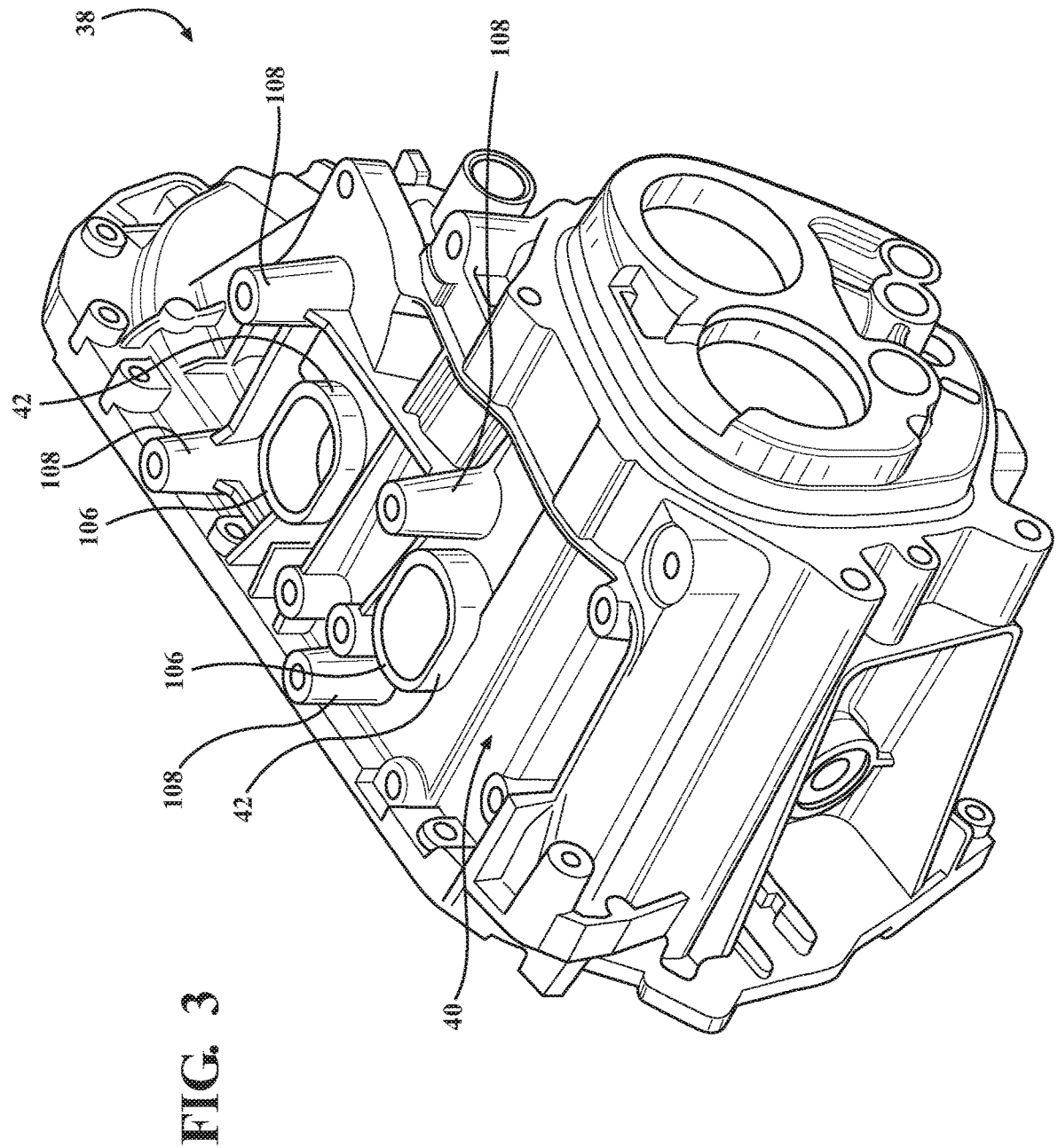

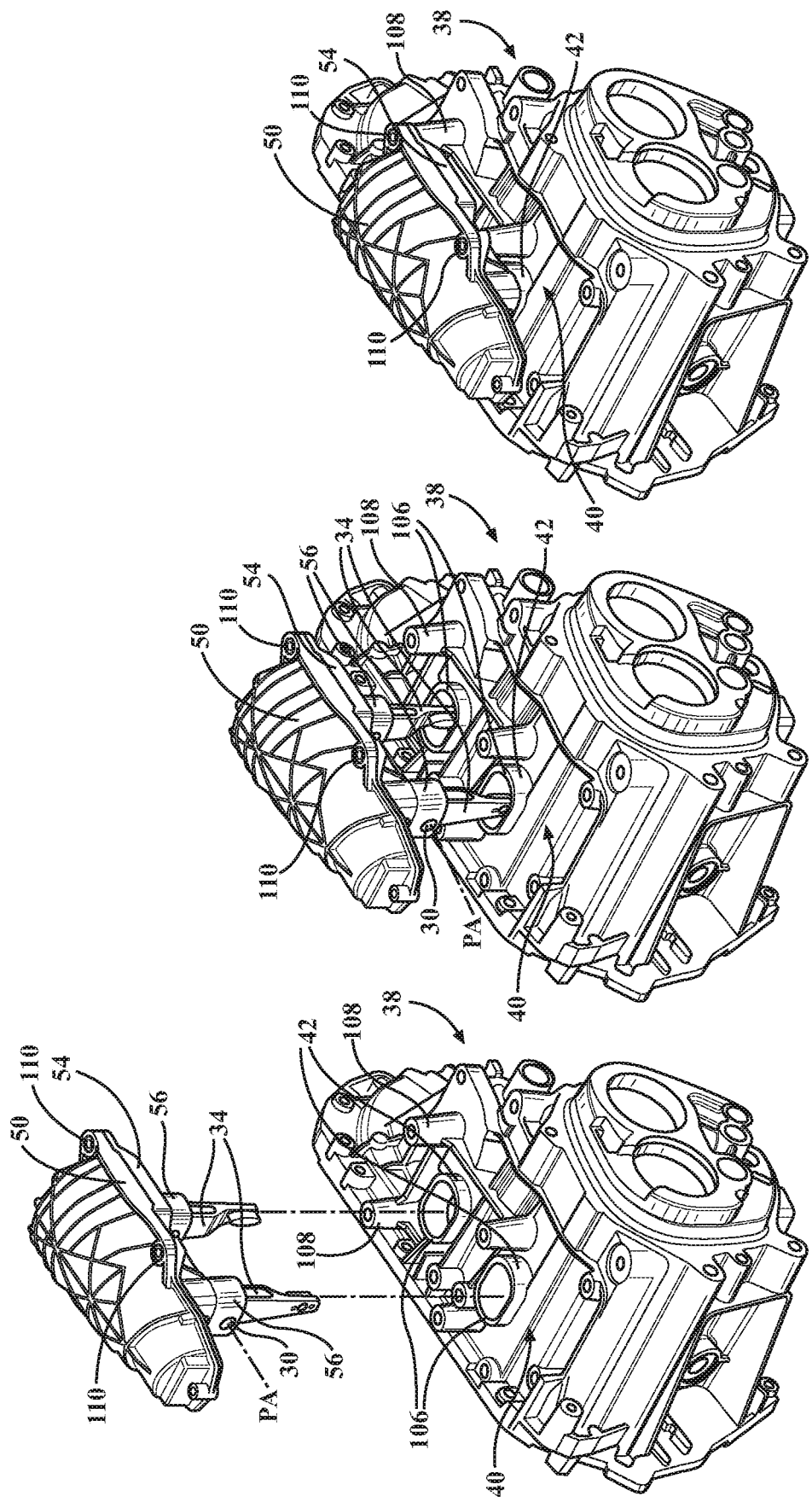

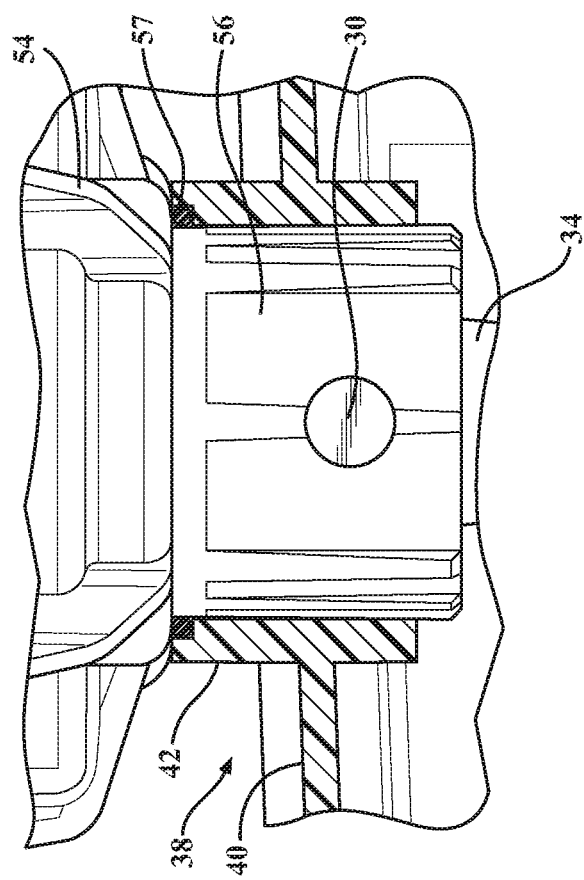
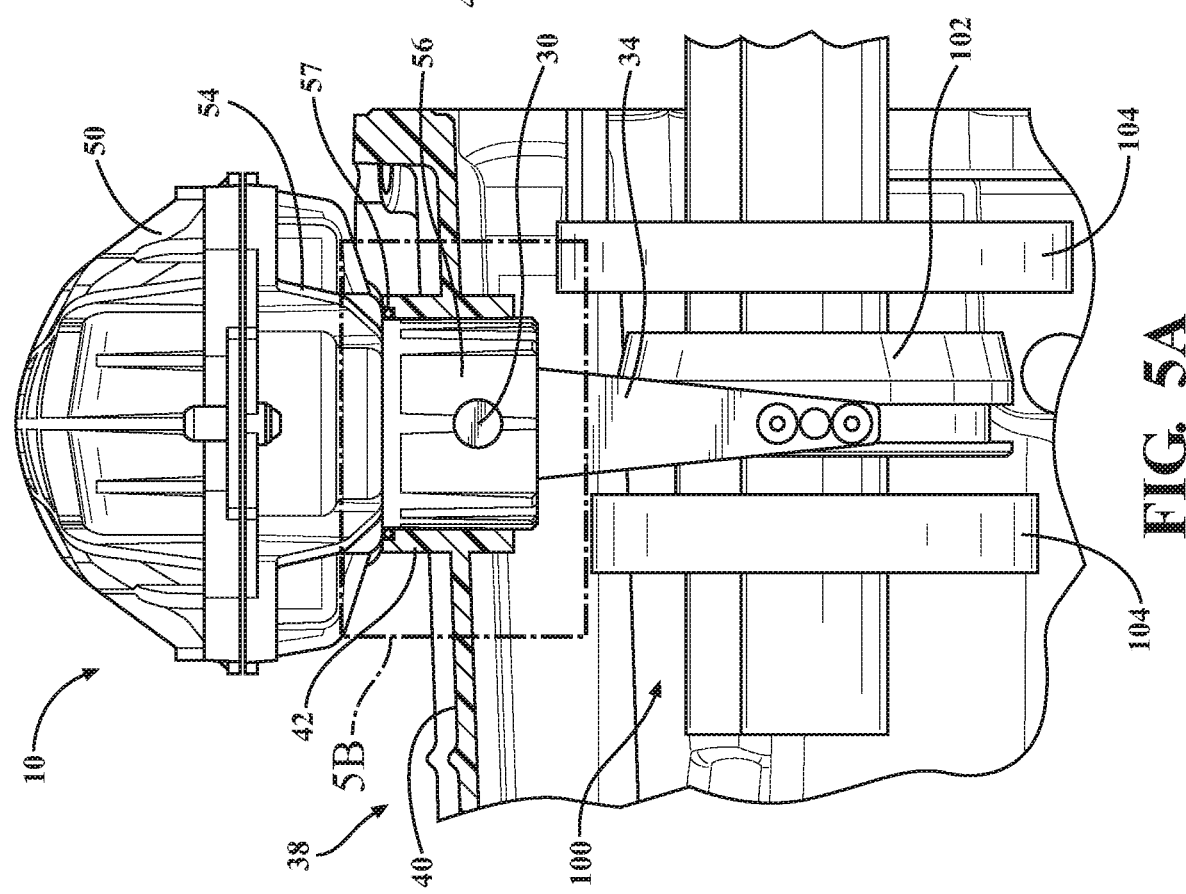
FIG. 5B
FIG. 5A

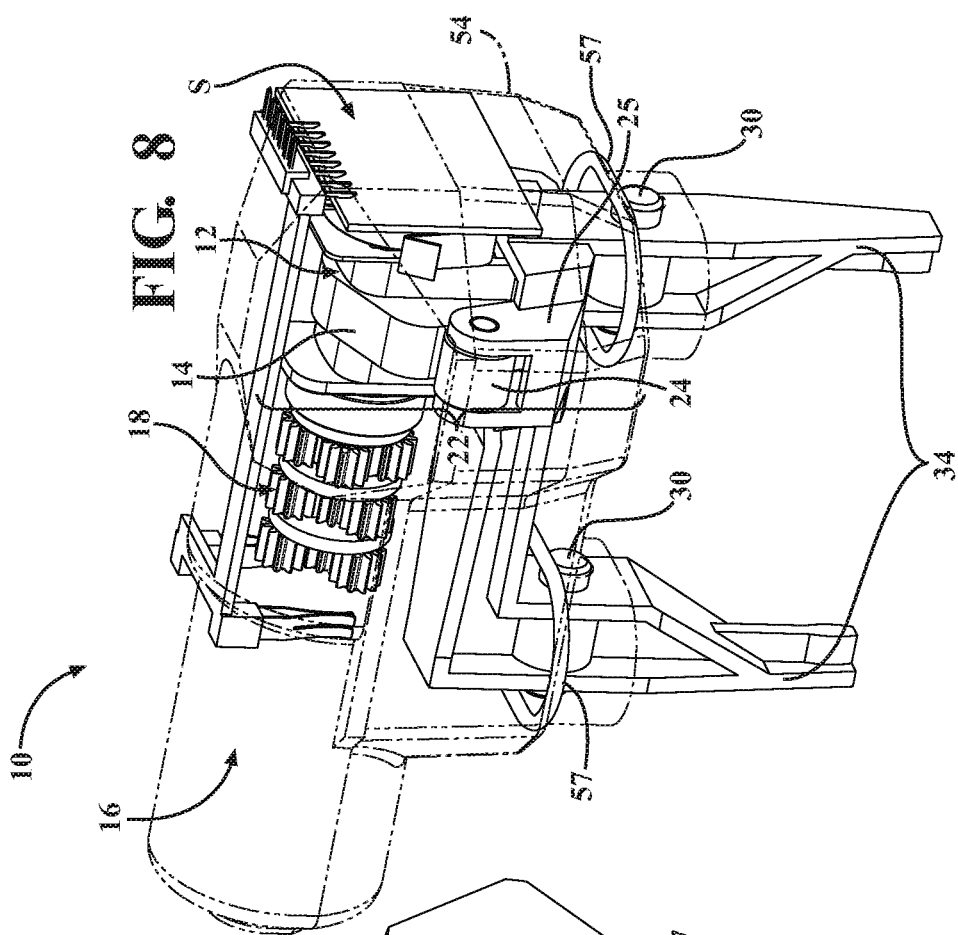
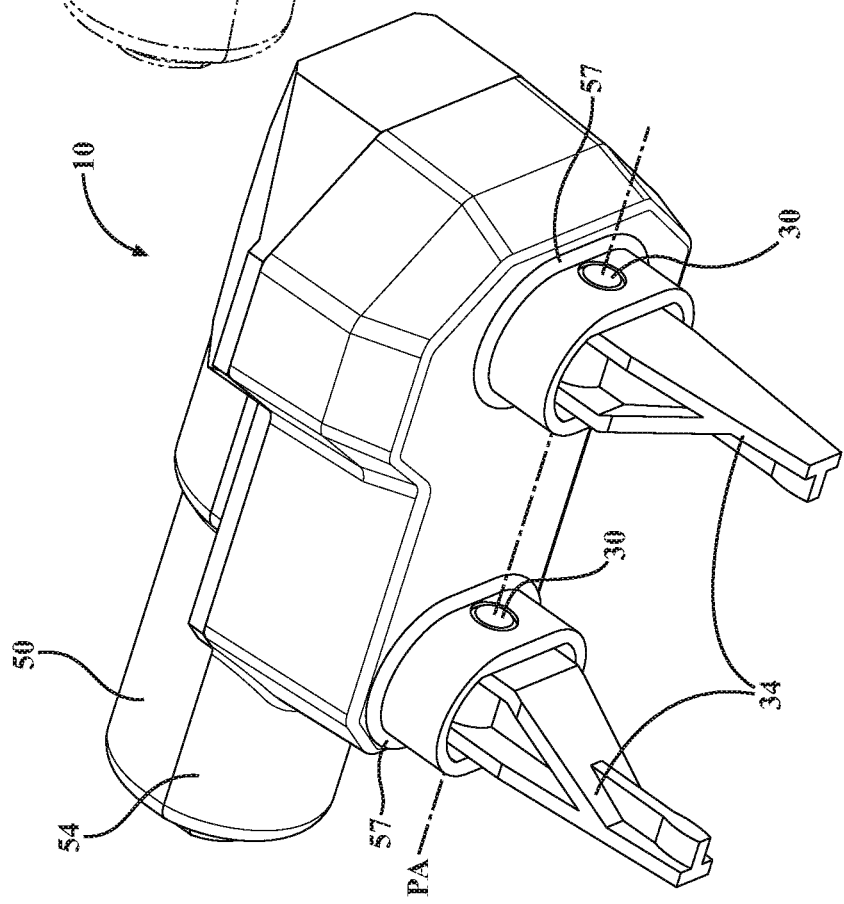

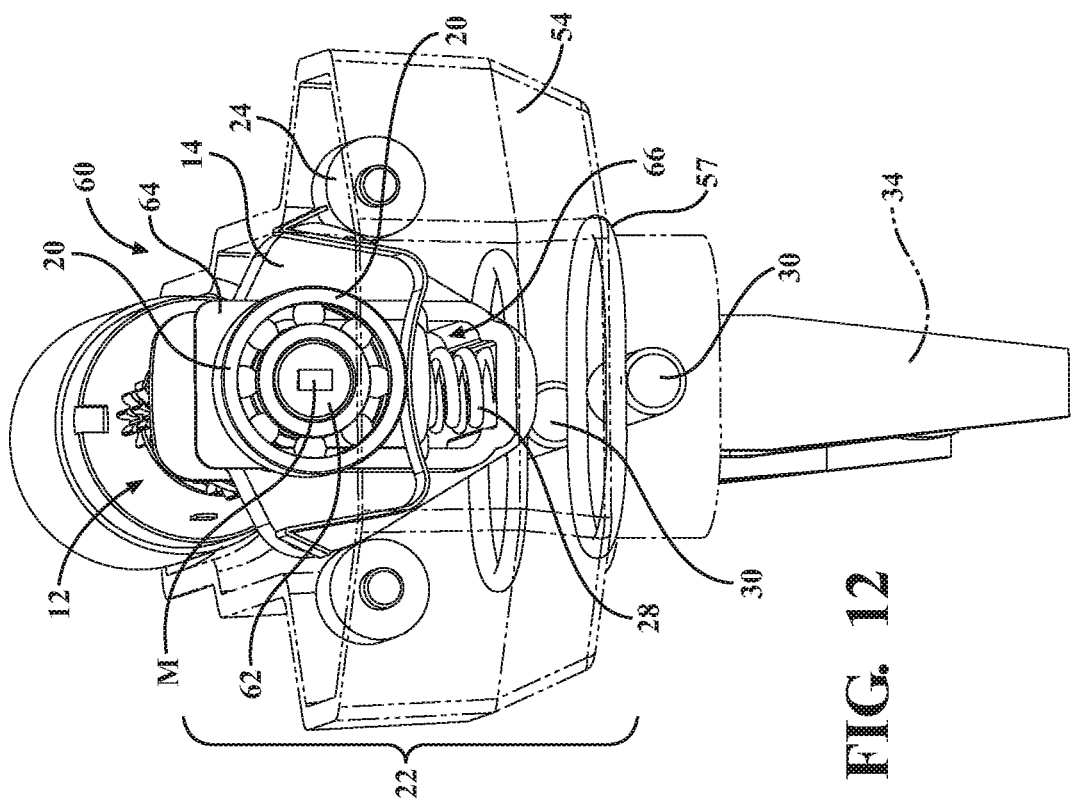
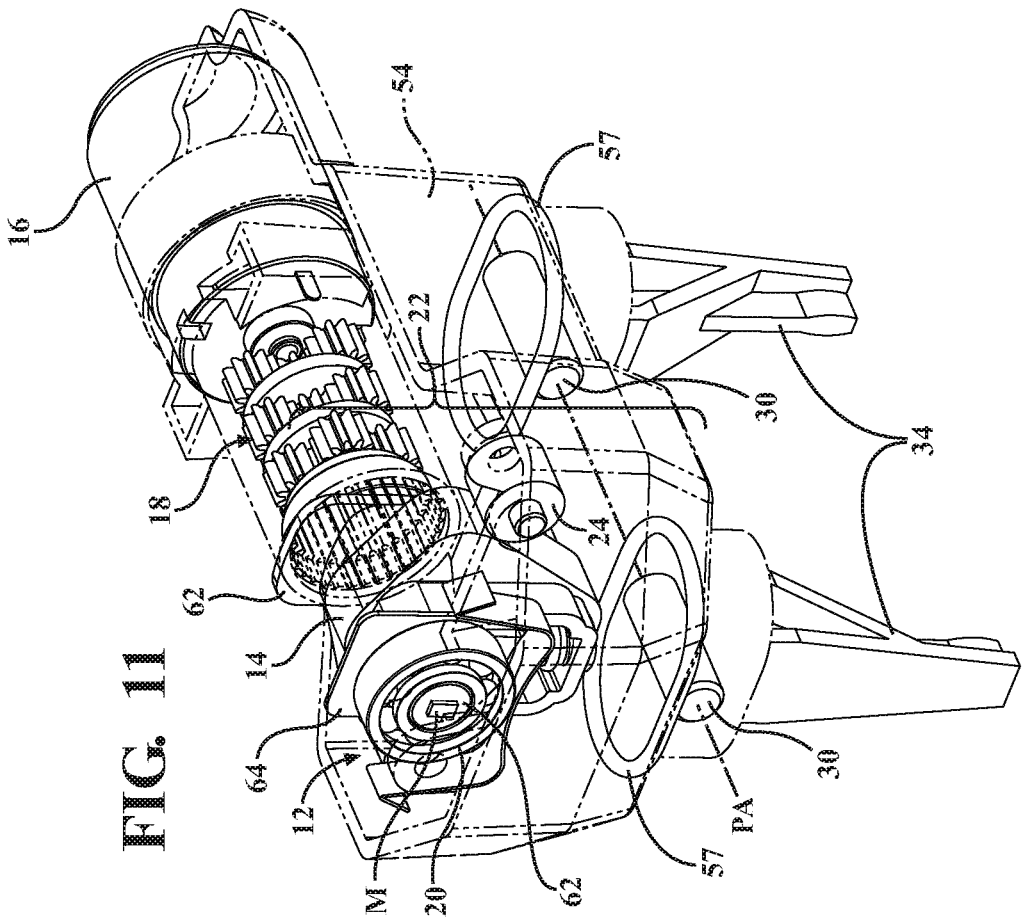

ACTUATOR SYSTEM

CROSS-REFERENCE TO RELATED APPLICATIONS

The subject patent application is the National Stage of International Application No. PCT/IB2021/059736, filed on Oct. 21, 2021, which claims priority to and the benefit of U.S. Provisional Application No. 63/174,815, filed on Apr. 14, 2021, the entire contents of which are incorporated by reference herein.

TECHNICAL FIELD

The teachings generally relate to an actuator system including an actuation assembly with an integrated fork and spring assist for use with a gear assembly, typically in non-synchronized mechanisms.

BACKGROUND

Generally, gear assembly actuation is done manually or with the assistance of an actuator. However, most examples have separate actuation assemblies from the fork. In actuators utilizing separate actuation assemblies and forks, the integration of the separate components into a gearbox is complex and application specific, presenting the challenge of utilizing one actuator assembly into several applications.

Typically, the actuation member is configured to linearly move a fork connected with a dog clutch between a plurality of positions. The actuator assembly is operated with a manual force (e.g. a standard gearbox where a user selects gears by moving an actuator from position to position) or with an actuator to move a fork connected with a dog clutch between positions. Given the nature of some gear actuation, when a sliding gear is being moved from a disengaged position into engaged with a receiving gear, there is a momentary blockage or misalignment of gear teeth on the sliding gear and the gear teeth on the receiving gear. In this moment of misalignment, the shift fork is pressing the sliding gear against the receiving gear but the sliding gear is not entering the receiving gear, generating resistance against the fork since the sliding gear teeth and the receiving gear teeth are not aligned. The time window for engagement is typically short due to gear assembly design. If time window is not utilized, a stronger motor is required as force becomes higher to force the teeth of the sliding gear into alignment with the teeth of the receiving gear. This uses a larger force and operates slower, which may not seat the sliding gear into the receiving gear as far, and/or cause premature wear and damage on the system.

It would be attractive to have an actuator which is low cost with a simple integration into several different systems and types on gearboxes. It would be attractive to have an actuator which provided fast shifts with low force and high acceleration, preventing damage and premature wear. It would be attractive to have an actuator with an integrated fork and actuator.

SUMMARY

The present teachings solve one or more of the present needs by providing an actuator with low cost, simple integration into a variety of applications, and fast actuation between positions while applying a low force with exceptional penetration.

The present teachings provide for an actuator including a support; a drive system connected to the support; a shift fork operatively connected to the drive system and configured to move a distance defining a stroke length between a disengaged position and an engaged position, the shift fork having a cam follower; a cam assembly operatively connected with the drive system to move between a neutral position, and a shifted position, with a plurality of intermediate positions between the neutral and shifted positions, the shift fork being in the disengaged position when the cam assembly is in the neutral position, the cam assembly including: a cam having an aperture defining an interior surface; a hub housing disposed within the aperture of the cam and connected to the drive system; and a biasing member disposed within the aperture and preloaded between an interior surface of the aperture of the cam and the hub housing. When the cam moves relative to the hub housing, the biasing member compressing between the hub housing and interior surface of the cam when the cam assembly is rotated through the plurality of intermediate positions and the shift fork remains in the disengaged position due to an interference. The cam moves relative to the hub housing with the biasing member expanding to push the cam against the shift fork such the shift fork moves through the stroke length from the disengaged position to the engaged position upon clearance of the interference.

BRIEF DESCRIPTION OF THE DRAWINGS

FIG. 1 is a perspective view of an actuator with integrated fork.

FIG. 2 is a side view of the actuator with integrated fork.

FIG. 3 is a perspective view of a gearbox.

FIGS. 4A-4C illustrate an actuator with integrated fork connecting with the outer surface of the gearbox.

FIG. 5A is a partial longitudinal cross-section view of a section of the actuator connected with the gearbox and a gear assembly.

FIG. 5B is an enlarged view of FIG. 5A at the connection area between the actuator and the gearbox case.

FIG. 7 is a perspective view of the actuator and integrated fork.

FIG. 8 is a perspective view of the actuator system and associated components with the support shown in phantom.

FIG. 11 is a perspective view of the actuator system without the cover and the support in phantom showing the gear set.

FIG. 12 is an end view of the actuator.

DETAILED DESCRIPTION

Figure 6B:
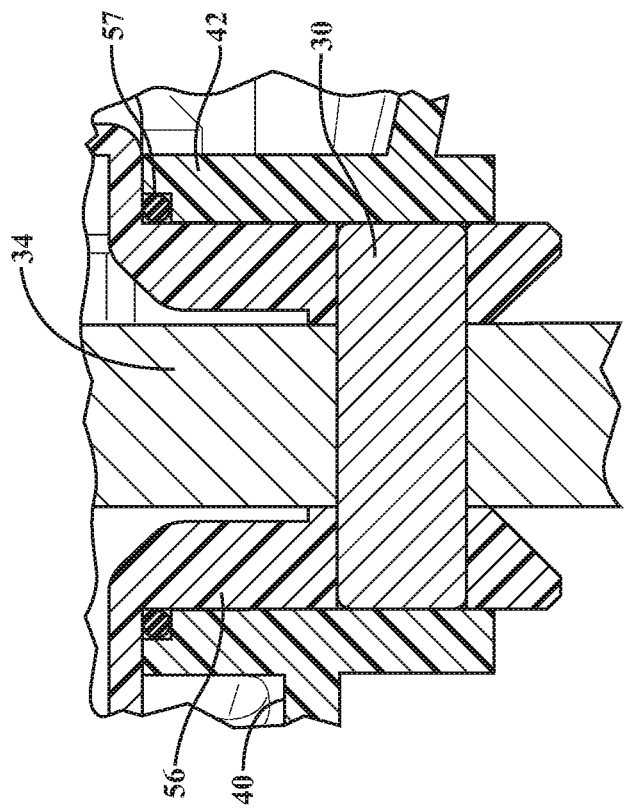
FIG. 6B is an enlarged view of a portion of FIG. 6A at the connection area between the actuator and the gearbox case.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to an actuator 10 (also referred to as the actuator system). The actuator system 10 includes an actuation assembly 22 that functions to move a shift fork adapted to connect with a dog clutch 102 between a disengaged position 44 and one or more engaged positions 46. The actuator system 10 includes a cam assembly 12. The actuator system 10 may be connected with a controller. The controller may function to selectively disengage and engage the actuator system 10 by signaling the cam assembly 12 to interact with the shift fork 34, moving the shift fork 34 between positions. The actuator 10 may be attached to a transmission, a transfer case, an axle, a gearbox, a controller, the like, or a combination thereof. The actuator 10 may be used in automobiles, autonomous vehicles, robots, trucks, marine vessels, or any other vehicle or machine that utilizes moving gears. The actuator system 10 may be used on any device that couples two rotating shafts, gears, or other rotating components. For example, the actuator system 10 is adapted to move a dog clutch 102 in and out of engagement with a receiving gear 104. The actuator system 10 may be used in conjunction with multiple actuator systems. For example, a transmission may have a first actuator system 10 which actuates a first gear and a second gear, and a second actuator system 10 which actuates a third gear and a fourth gear. It is contemplated that each actuator system 10 may move a dog clutch 102 into communication with one or more receiving gears 104.

The actuator system 10 is shown in FIGS. 1-2 and 7-8 in a perspective view. The actuator system 10 includes a base or a support 54 and a housing or a cover 50. The support 54 and the cover 50 form a cavity therebetween. The housing has a relatively low profile, minimizing the amount of space needed to house the actuation assembly 22. The shift fork 34 extends from through the support 54, configured to slide inside of a gearbox and operatively couple with a dog clutch 102. The shift fork 34 is pivotally coupled with the support 54. The actuator system 10 is configured to mount to the surface 40 of a gearbox 38, which is shown in FIGS. 4A-4C and partially shown in FIGS. 21A-22C.

The support 54 includes at least one pair of lugs 56, each lug extending away from the support 54, having an opening extending from the cavity formed between the support 54 and the cover 50. Each of the lugs 56 has an opening and an outer surface. The lugs each form a passage from the inner portion of the cavity. The lugs 56 each have a shape to allow the shift fork 34 to move between the neutral position and shifted position. The lugs 56 assist in mounting the actuator system 10 to the outer surface 40 of a gearbox 38. Each lug 56 is axially disposed around a portion of the shift fork 34 and may connect with and provide a pivot point 30 to the shift fork 34, described further below.

Figure 6A:
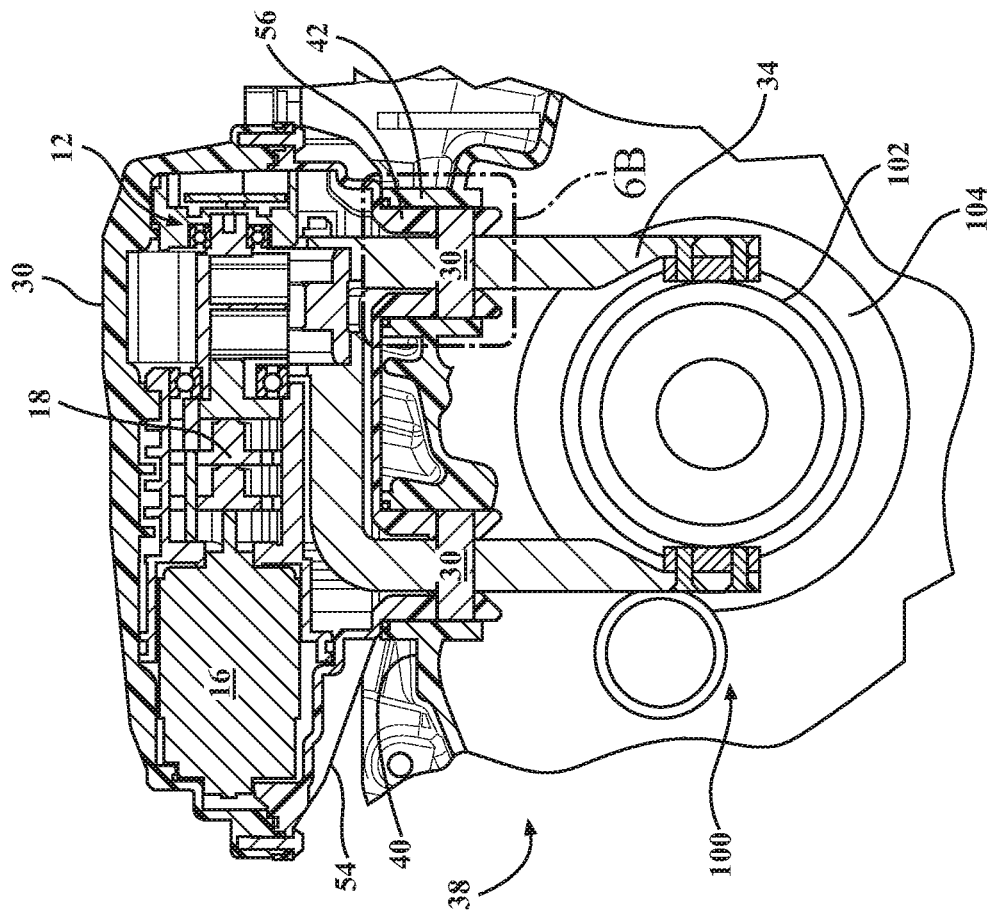
FIG. 6A is a partial lateral cross-section view of the actuator connected with the gearbox and the gear assembly.
Figure 9:
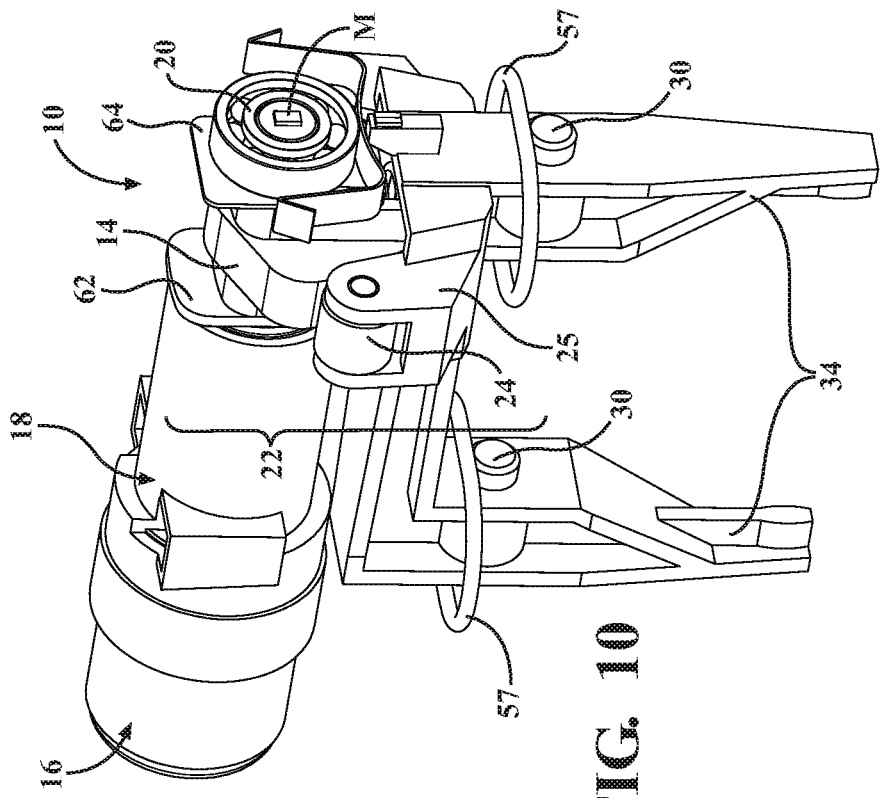
FIG. 9 is a perspective view of the actuator system without the cover and the support shown in phantom.
Figure 10:
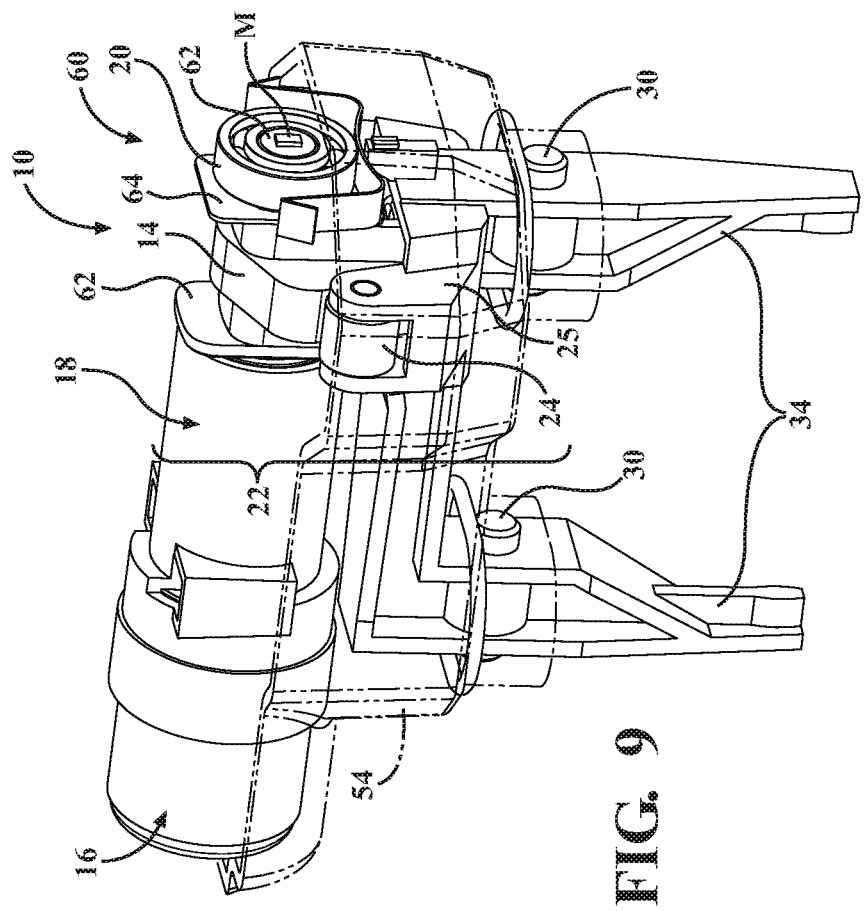
FIG. 10 is a perspective view of the actuator without the cover and the support.
Figure 13B:
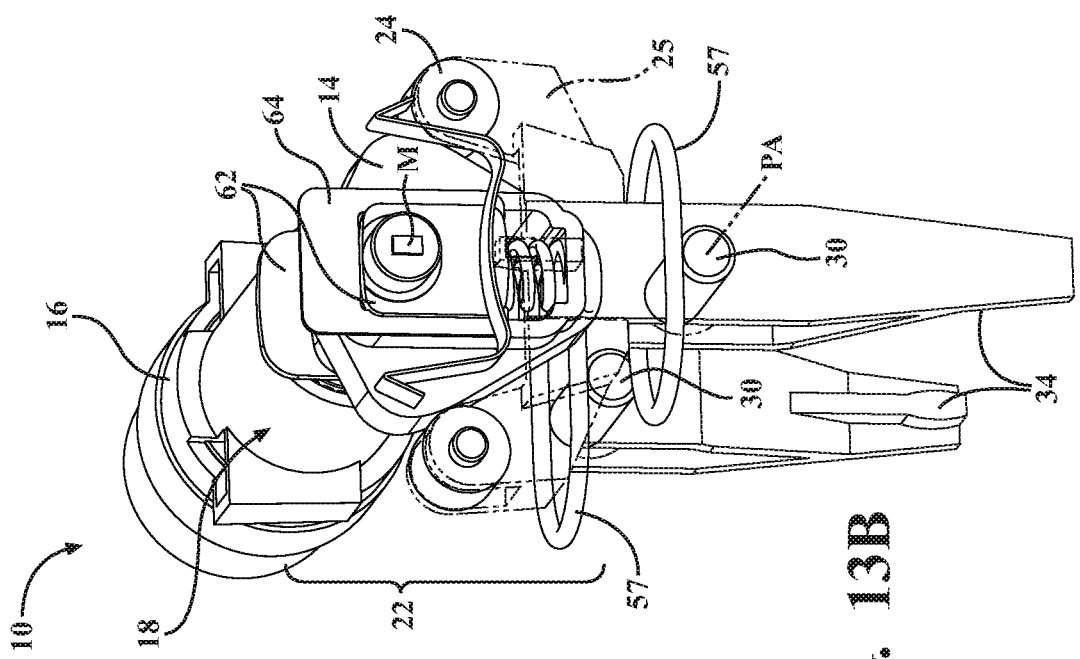
FIGS. 13A and 13B illustrate perspective views of the actuator without a cover.
Figure 13A:
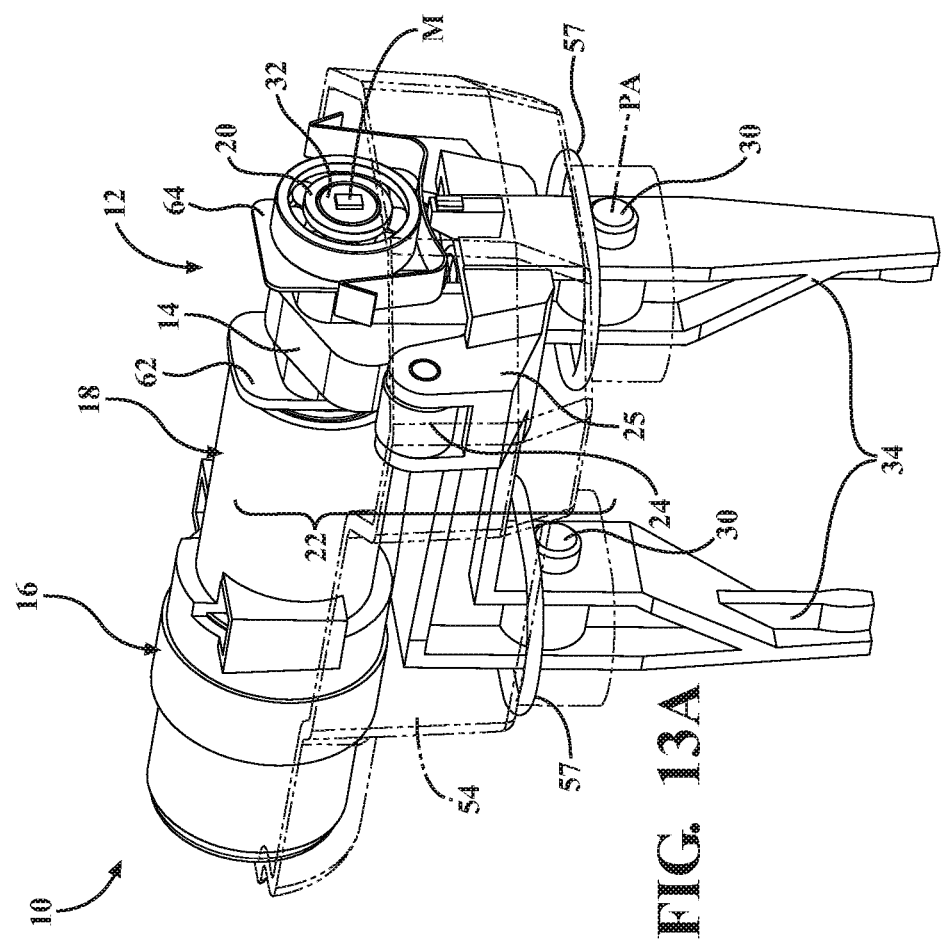

As seen in FIG. 3, the gearbox 38 includes at least one pair of apertures 42 in the surface 40 to allow at least a portion of the actuator system 10 and the shift fork 34 to pass into the gearbox 38. The holes on the gearbox are small in order to maintain structural rigidity and strength. Similarly, the shift fork 34 is sized to pass through the apertures 42 on the surface 40 of the gearbox 38. The shift fork 34 is shown below a partial view of the gearbox surface 40 in schematic FIGS. 21A-21C and 22A-22C, while the remainder of the actuator system 10 is above the surface 40 of the gearbox 38. FIG. 3 illustrates a perspective view of a gearbox 38 showing the pair of apertures 42 as bosses extending from the outer surface 40 of the gearbox. In some examples, the gearbox 38 includes a gear assembly 100, configured as a dog clutch assembly, which is illustrated in FIGS. 5A and 6A. The apertures 42 located on the outer surface 40 of the gearbox 38 provide passages to receive the shift fork 34 and at least a portion of the support 54.

FIGS. 4A, 4B, and 4C show the actuator system 10 connecting with the gearbox 38. FIG. 4A depicts at least one shift fork 34 of the actuator system 10 aligned with the apertures 42. The lugs 56 and the apertures 42 have complimentary shapes, the apertures 42 sized larger than the lugs 56 in order to receive the lugs 56. The apertures 42 include a sealing surface 106 for mating with the seal 57 located around each lug 56 and on the bottom surface of the support 54.

FIGS. 5A and 6A are partial cross-sectional views of the actuator system 10 and the gearbox 38. FIG. 5A shows a partial longitudinal cross-section of the actuator system 10 and the gearbox 38. Similarly, FIG. 6A shows a partial lateral cross-section of the actuator 10 and the gearbox 38. The actuator system 10 passes at least a portion of the shift fork 34 and the lugs 56 through the outer surface 40 of the gearbox 38 to connect the shift fork 34 with the gear assembly 100 (shown in FIGS. 5A and 6A). The lug 56 and the pivot 30 can be seen in FIGS. 5A and 6A disposed below the surface 40 of the gearbox 38. When connected, as shown in FIG. 5A, the shift fork 34 engages the dog clutch 102 (also referred to as slider gear) to move the dog clutch 102 through positions 44, 46, 48 into and out of engagement with receiving gear(s) 104.

FIG. 6A shows the partial lateral cross-sectional view of the actuator system 10 and the gearbox 38, with the actuator system 10 connected with the gear assembly 100. As explained further below, the cam assembly 12 and actuation assembly 22 work to move the dog clutch 102 between positions 44, 46, 48 by pivoting shift fork 34 between positions. FIG. 6A illustrates the pair of arms of the shift fork 34 each disposed within one of the pair of lugs 56, each arm pivotally connected 30 to a corresponding lug of the pair of lugs 56. The arms of the shift fork 34 are spaced apart corresponding to the size of the dog clutch 102. FIG. 6B is a close-up lateral view of a lug 56 retained within the aperture 42 with the pivot 30 below at least a portion of the outer surface 40 of the gearbox 38. In some examples, the pivot connection 30 is below the outer surface 40 of the gearbox 38.

Turning to FIGS. 9 through 13B, the actuator system 10 includes a cam assembly 12. The cam assembly 12 functions to actuate the shift fork 34 between positions. The cam assembly 12 is configured to move between a neutral position, an intermediate position, and a shifted position, moving the shift fork from the disengaged position 44 to the engaged position 46. The cam assembly 12 is configured to transition to and from the neutral position and the shifted position through a plurality of intermediate positions, however, for purposes of this application "intermediate position" encompasses the plurality of possible positions between the neutral position and the shifted position. The shifted position of the cam assembly 12 corresponds with the engaged position 46 of the shift fork 34, and the neutral position corresponds with the disengaged position 44 of the shift fork 34. The cam assembly 12 connects with the gear set 18 through an output 15. The output 15 has any suitable size or shape to connect the gear set 18 with the cam assembly 12. For example, the output 15 may be a shaft, an axle, a coupler, or the like, which is received by the cam assembly 12. The cam assembly 12 functions to transition the shift fork 34 through various positions when a signal from a controller (not pictured) is sent to the motor 16 to rotate the gear set 18 connected to the cam 14, rotating the cam 14 and contacting the cam follower 24 to pivot the actuator bracket 25 and the shift fork 34 between the disengaged position 44 and the engaged position 46. The cam assembly 12 may have one or more bosses to receive one or more bearings 20. The bearings 20 function to constrain the movement of the cam assembly 12 to rotation, and to transfer radial force from the cam 14 to the support 54.

The actuator system 10 includes a drive system comprising a motor 16, a gear set 18, and an output 15. The motor 16 functions to rotate a gear set 18 which in-turn rotates the output 15, turning the cam assembly 12. The motor 16 functions to receive a signal from a controller to rotate clockwise or counterclockwise depending on the pivotal movement required to move the shift fork 34 between positions 44, 46. Similar to the movement of the cam assembly 12, the shift fork 34 moves to and from the disengaged position 44 and the engaged position 46 through a plurality of intermediate positions 48, however, for purposes of this application "intermediate position" encompasses the plurality of possible positions between the disengaged position 44 and the engaged position 46. The motor is mounted to the support 54. The motor 16, as shown in the figures, is an electric motor, however, any suitable means for actuating the cam assembly 12 is contemplated, such as a pneumatic actuator, hydraulic actuator, a manual actuation, or the like. The motor 16 rotates gear set 18 which rotates the cam assembly 12.

Figure 14:
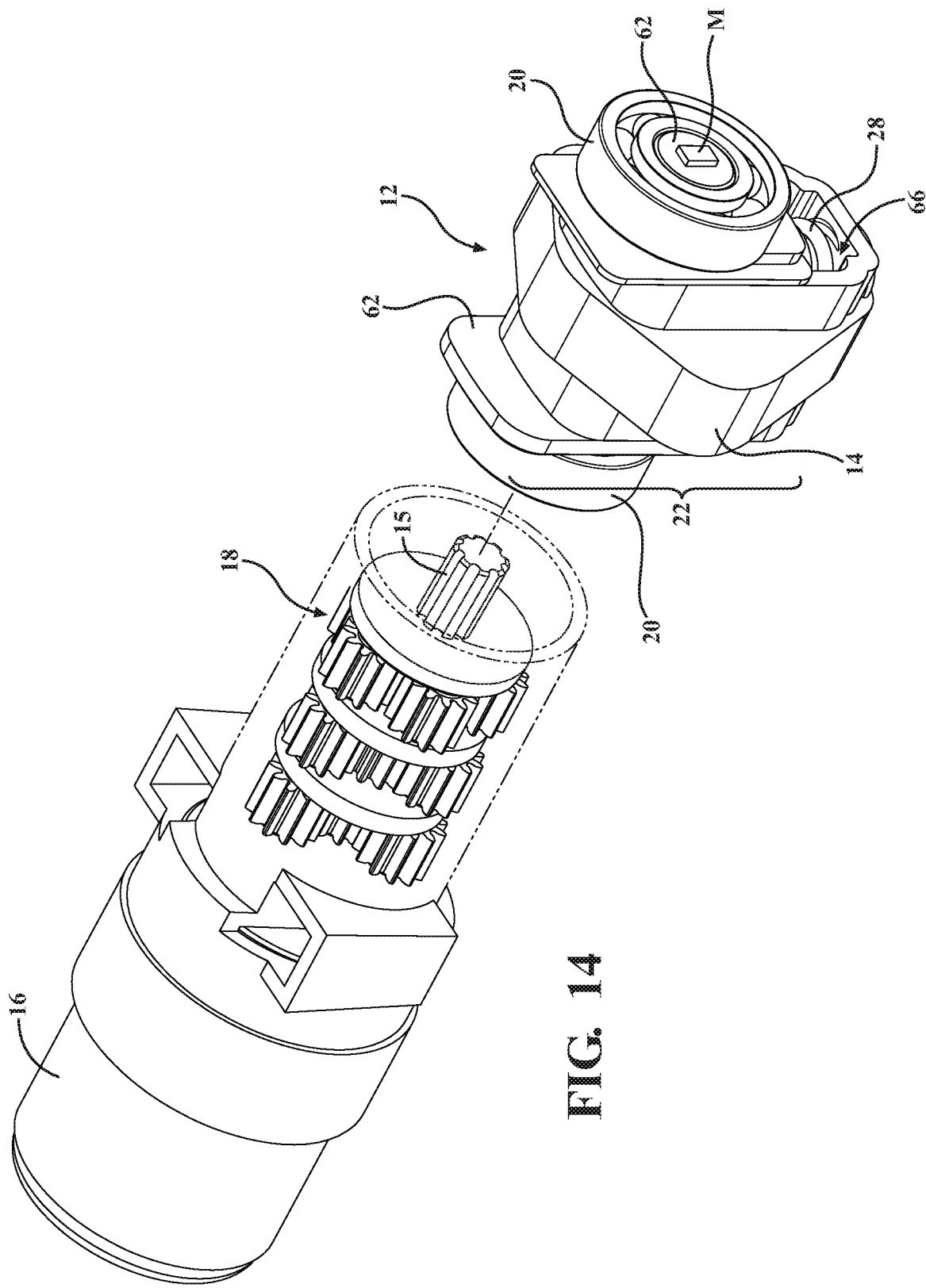
FIG. 14 is a perspective view of the actuator motor and gearset connected with a portion of the actuator system.

As best seen in FIGS. 11, 12, and 14, the actuator system 10 includes a gear set 18. The gear set 18 functions to amplify torque generated by the motor 16 to increase the rotational torque of the cam 14. The motor 16 rotates the gear set 18, turning the cam assembly 12. The gear set 18 rotates the cam 14 with a greater torque than the amount of torque produced by the motor 16, actuating the shift fork 34 between positions 44, 46, 48 with greater torque and force, at a lower angular velocity. The gear set 18 may be a planetary gear arrangement which amplifies torque to increase the force which the cam 14 applies against the cam follower 24.

Figure 21C:
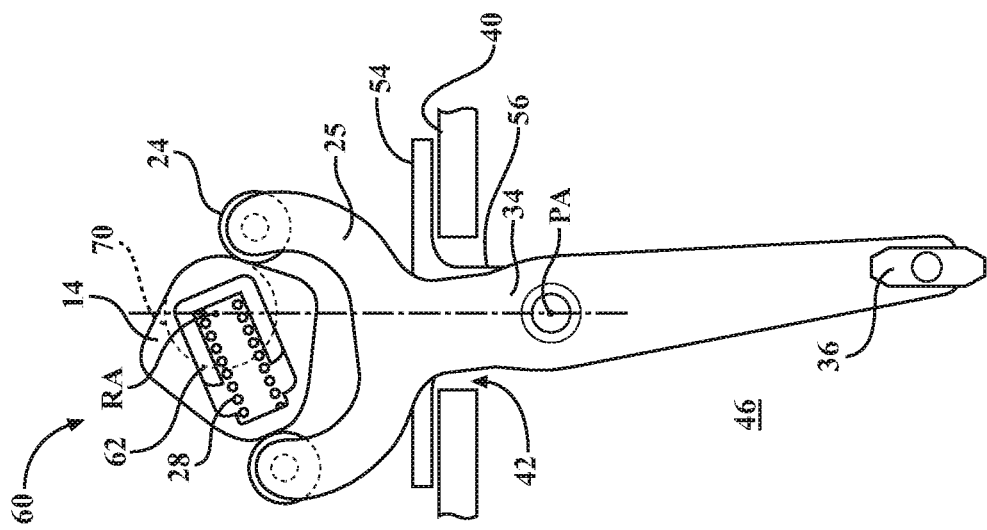
FIGS. 21A-21C illustrate schematic end views of the actuator in a disengaged position, an intermediate position, and an engaged position, respectively.
Figure 21B:
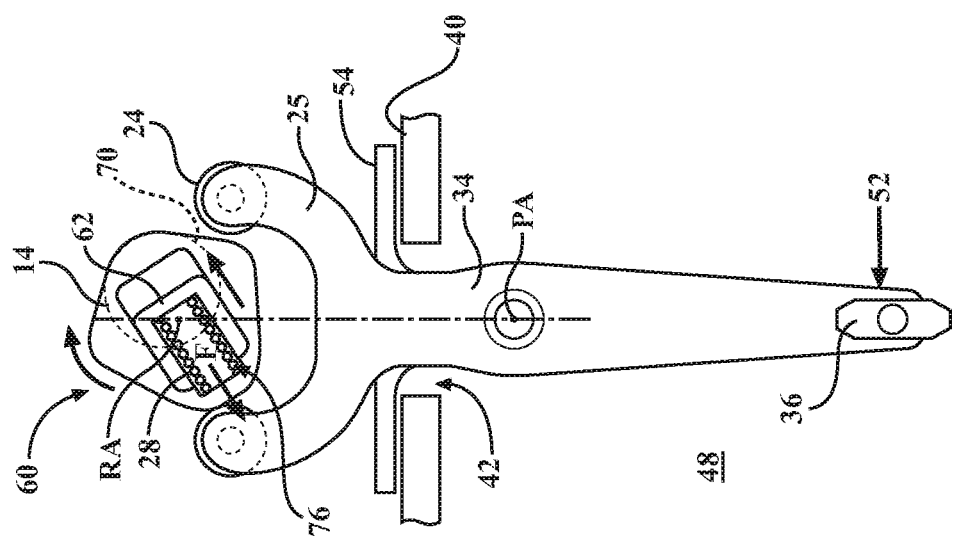
Figure 21A:
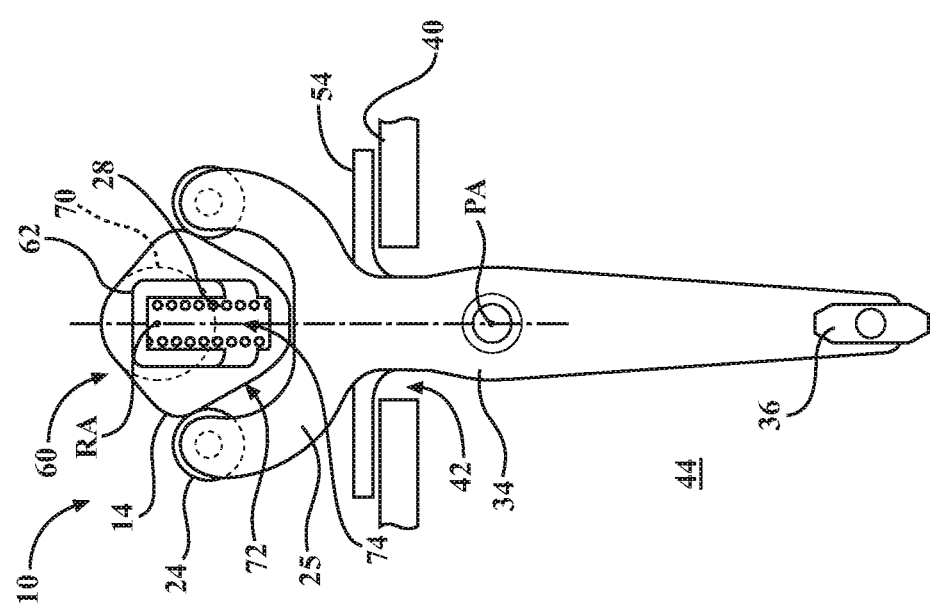

The actuator system 10 includes an actuation assembly 22 in communication with the cam assembly 12. The actuation assembly 22 functions to be moved by the cam assembly 12 to pivot and move the shift fork 34 between positions 44, 46, 48 (FIGS. 21A-21C). The actuation assembly 22 at least includes a shift fork 34, one or more pivot couplers 30 connecting the shift fork 34 to the support 54. The shift fork 34 may include one or more cam followers 24 and an actuator bracket 25 configured to hold and position the one or more cam followers 24.

The cam follower 24 functions to contact the cam 14 as the cam 14 is rotated. The cam follower 24 functions to convert the contacting force of the cam 14 into pivotal movement of the shift fork 34. In the examples, such as shown in FIGS. 9-13B, the cam follower 24 is attached to an actuator bracket 25 disposed around the axis of the cam 14 so that the follower portion 72 of the cam 14 is positioned to contact the cam follower 24 during rotation (FIG. 21C). The actuator bracket 25 is directly connected with the shift fork 34, so that as the cam follower 24 is contacted, the actuator bracket 25 is moved by the cam 14 and the shift fork 34 is pivoted.

The actuator bracket 25 functions to hold the one or more cam followers 24. The actuator bracket 25 functions to convert the rotational force of the cam 14 into pivotal movement of the shift fork 34 about the pivot axis PA, pushing the dog clutch 102 linearly. As mentioned above, the actuator bracket 25 may be a portion of the shift fork 34. The actuator bracket may have a c-shape or u-shape. In the example shown in FIGS. 9-13B, the actuator bracket 25 has a c-shape, so that when the one or more cam followers 24 are struck by the cam, the shift fork 34 pivots. The actuator bracket 25 may be formed with an opening, a pocket, a detent, or similar feature to allow the cam 14 to rotate through. The actuator bracket 25, as seen in FIGS. 5 and 6, may include a pocket configured to allow the cam 14 to rotate between the cam followers 24.

Figure 15B:
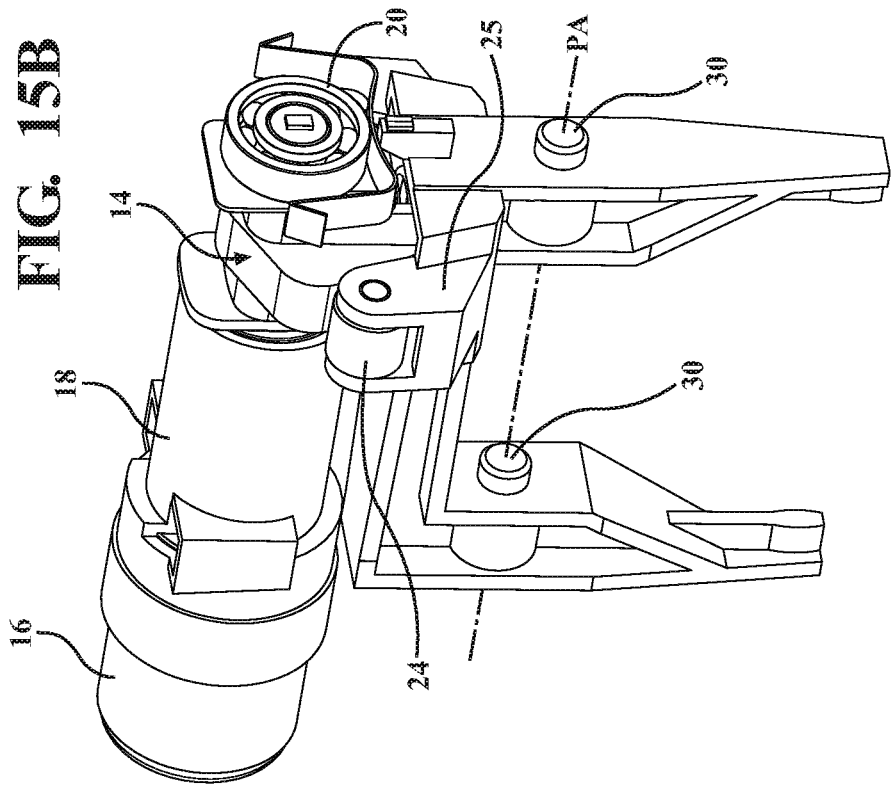
FIG. 15B is a perspective view of the actuator without the cover and the support.
Figure 15A:
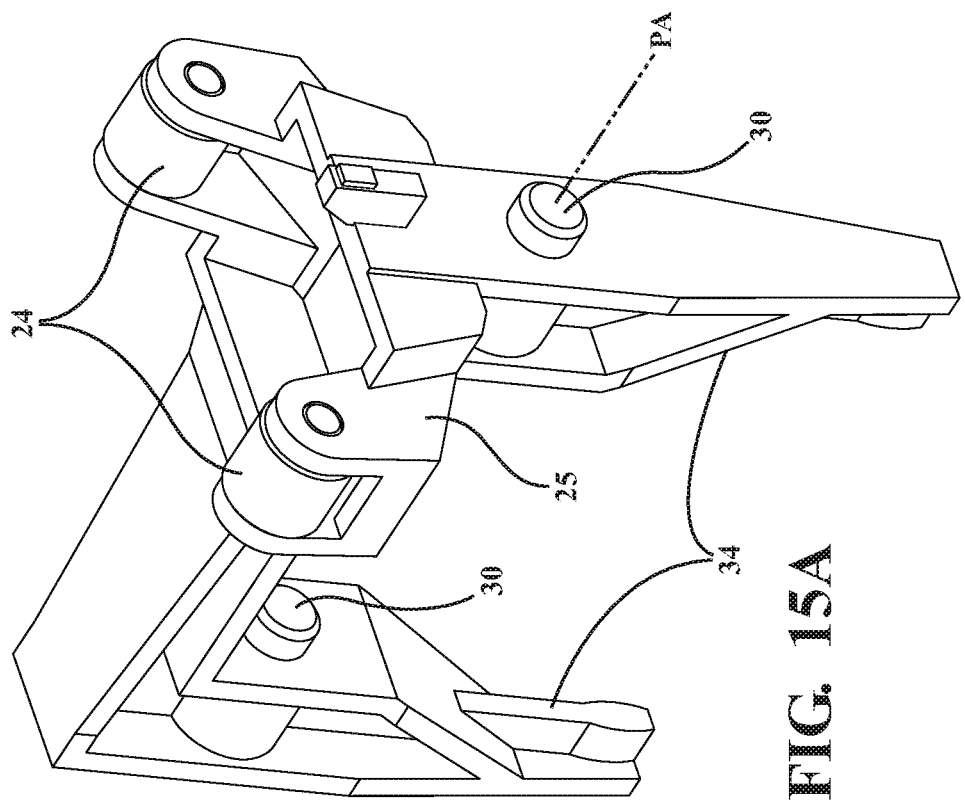
FIG. 15A is a perspective views of the shift fork.

Turning to FIGS. 15A and 15B, the shift fork 34 functions to pivot between a plurality of positions and is configured to move a dog clutch 102 between the plurality of positions, particularly into and out of engagement with one or more receiving gears 104. The shift fork 34 may have a general u-shape or c-shape, comprising a top surface and two arms disposed perpendicularly from the surface, reaching towards and engaging the dog clutch 102. In some examples, the actuator system 10 may include more than one shift fork 34. The shift fork 34 may include pads 36. The pads 36 may be located at the distal end of the shift fork 34 arms and configured to engage a dog clutch 102 (seen in FIGS. 21A-21C). The cam follower 24 and the actuator bracket 25 may be integral with the shift fork 34. The shift fork 34 is connected with the pivot coupler 30 (FIGS. 11 and 12). The shift fork 34 is pivotally coupled with the support 54 through the pivot coupler 30. A perspective view of one example of a shift fork can be seen in FIGS. 15A and 15B.

The cam assembly 12 includes a cam 14. The cam 14 functions to actuate the cam follower 24, the actuator bracket 25, and the shift fork 34. The cam 14 has a base circle 70 disposed around a rotational center of the cam 14 which rotates about a rotation axis RA and a follower portion 72 designed to interact with the cam follower 24 attached with the actuator bracket 25 to move the shift fork 34 between positions 44, 46, 48. The cam 14 may have a generally eccentric shape with a rounded outer surface corresponding with the profile of the cam 14. The cam 14 includes a base circle 70 and a follower portion 72. The follower portion 72 extends from the base circle 70 of the cam 14 and has a modified egg-like shape used to transition move the shift fork 34 between positions. The follower portion 72 includes a first section 78 including a pair of circular sections 92 having a first radius located on opposite sides of the cam 14, and a second section 80 having a distal tip 90 including a second circular portion with a wider radius than the circular sections 92 of the first section 78. The profile of the cam 14 is wide at the first section 78 and tapers to the second section 80. The profile of both the first section 78 and second section 80 have a rounded contact surface for contacting the cam follower 24. The circular sections of the first section 78 may be configured as concentric circles. As mentioned above, the radius of the distal tip 90 of the cam 14 may have a wider radius than the circular protrusions of the first section 78.

Figure 22C:
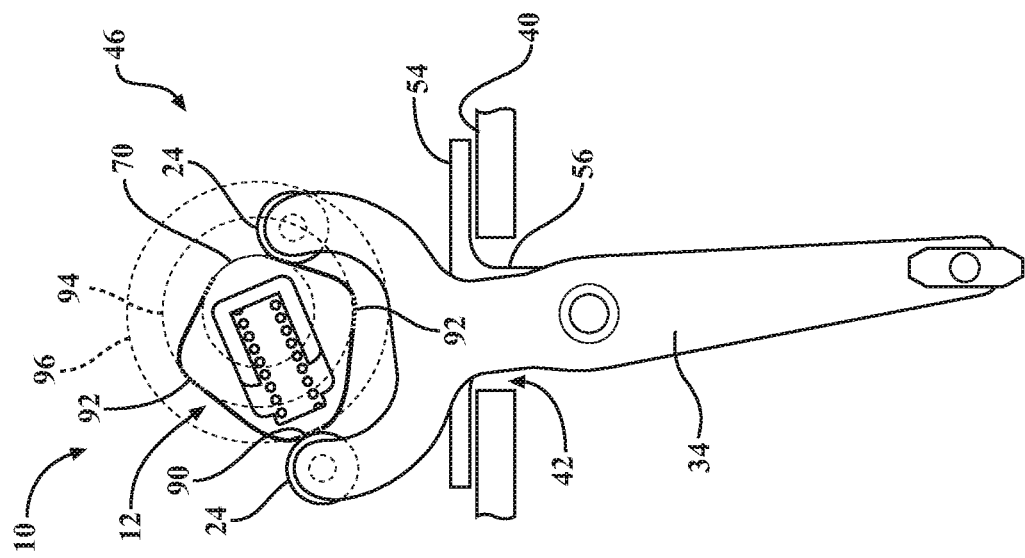
FIGS. 22A-22C illustrate schematic end views of the actuator system in a disengaged position, an intermediate position, and an engaged position, respectively.
Figure 22B:
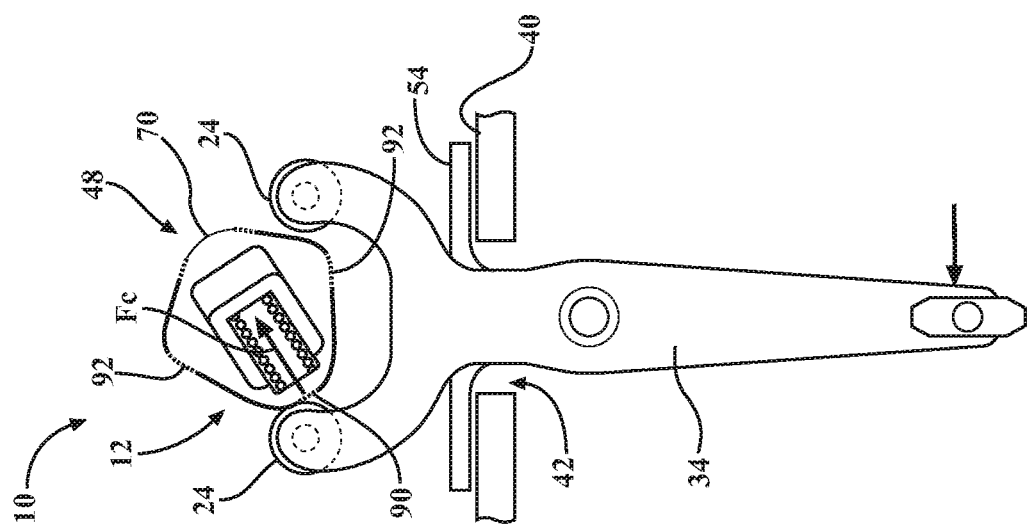
Figure 22A:
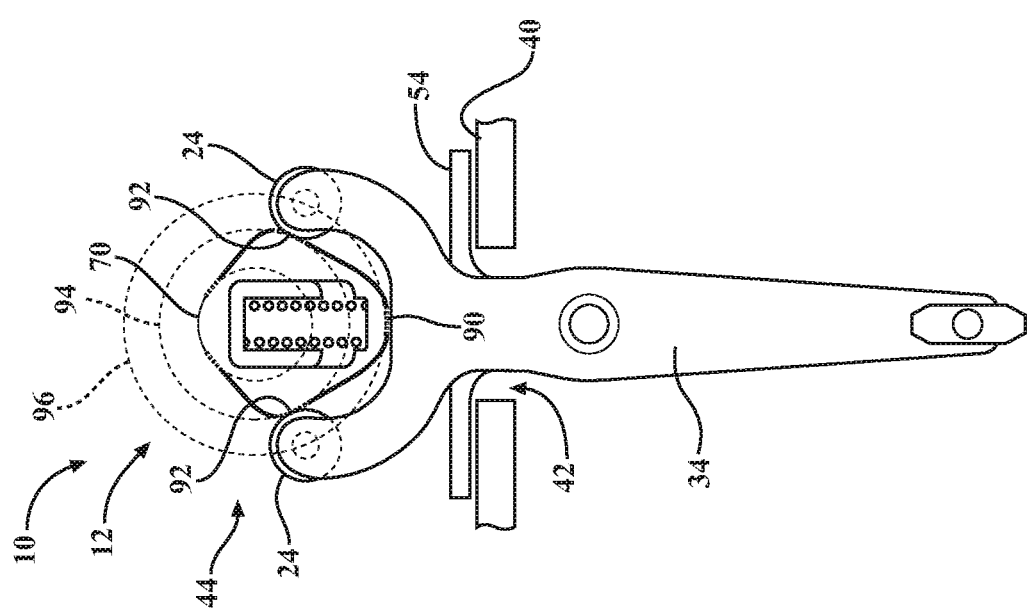

The circular sections 92 of the first portion 78 and the circular section 90 of the second portion 80 each correspond with a concentric circle 70, 94, 96 relative to the rotational center point of the cam 14. FIGS. 22A-22C depict a schematic view of the actuator system 10 with the concentric circles corresponding to the base circle 70, the first concentric circle 94 associated with the first circular sections 92, and a second concentric circle 96 corresponding with the distal tip 90. When two of the circular sections of the cam 70, 90, 92 are touching the cam followers 24, the cam assembly 12 and the drive system may be prevented from being backdriven by force transferred though the shift fork 34. When two of the circular sections 70, 90, 92 are contacting the cam followers 24, any torque applied through the shift fork 34 is directed towards the rotational center of the cam assembly 12 resulting in no rotational force onto the cam assembly 12.

The cam 14 is configured to radially move relative to the rotation axis, changing the position of the cam 14 relative to the rotational axis (explained further below). The cam 14 is configured to contact and move the cam follower 24 and actuator bracket 25 a specific distance, pivoting the shift fork 34 between positions 44, 46, 48, moving the dog clutch 102 into or out of contact with the receiving gear 104. The cam 14 is connected with and rotated by the gear set 18. The cam 14 includes one or more biasing member mounts 82 to receive one or more biasing members 28.

Figure 16A:
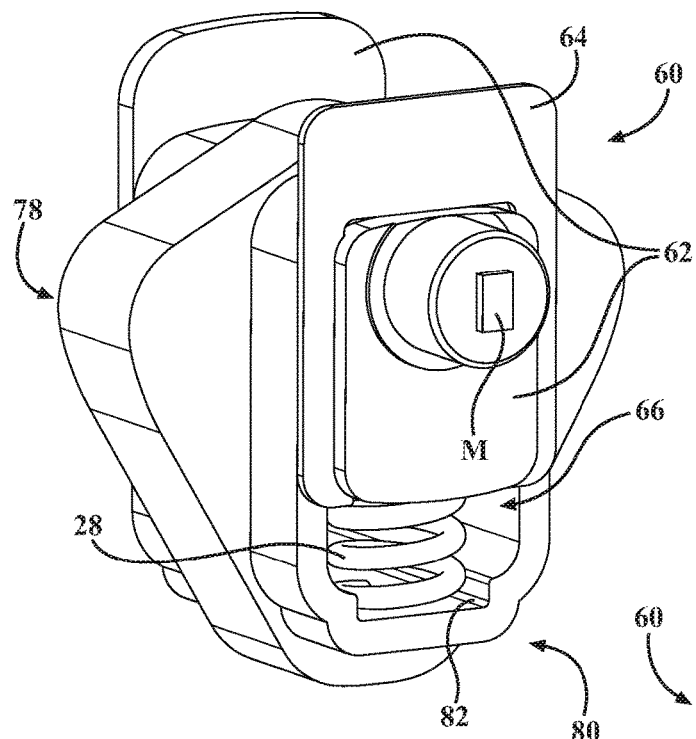
FIG. 16A is a perspective view of the hub assembly.
Figure 16B:
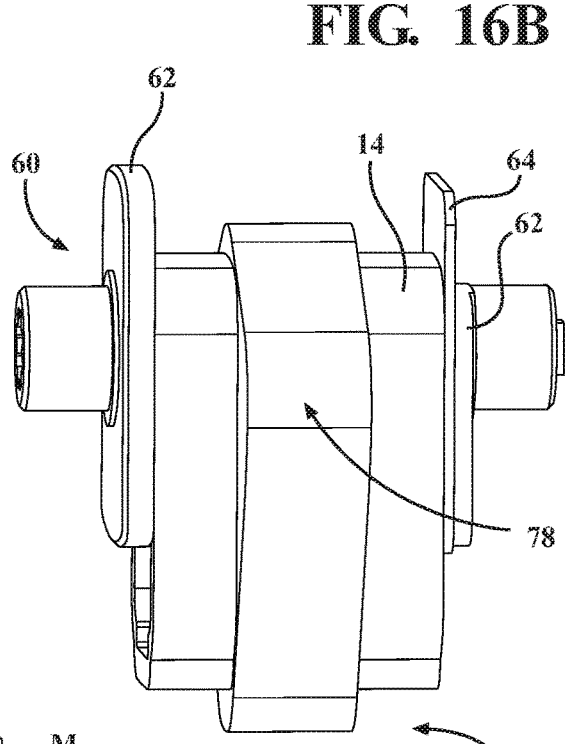
FIG. 16B is a side view of the hub assembly.
Figure 16C:
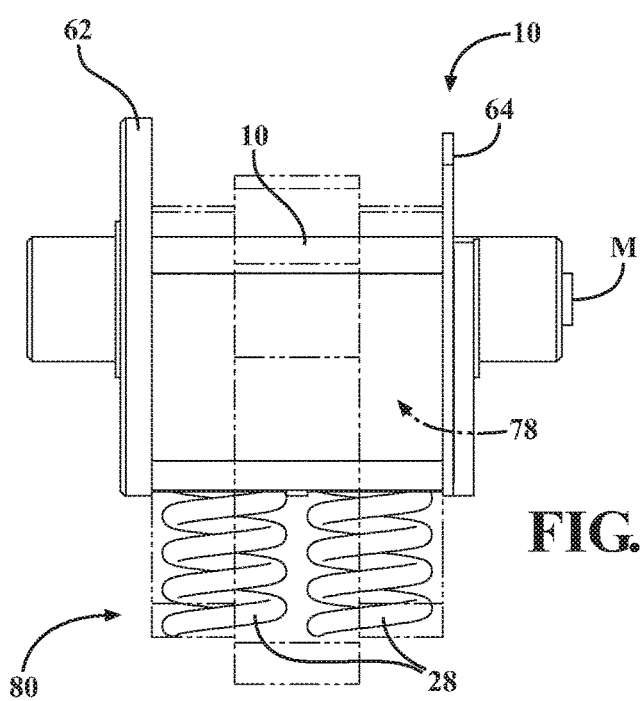
FIG. 16C is a side view of the hub assembly with the hub in phantom.

The biasing members 28 functions to assist the actuation assembly 22 in rapidly moving the actuation assembly 22 between the disengaged position 44 and the engaged position 46. The biasing members 28 functions to assist the shift fork 34 in overcoming a momentary blockage condition by storing potential energy in the biasing members 28 when compressed and releasing that energy as a force onto the cam follower 24 and the shift fork 34 (FIGS. 21B and 21C). The one or more biasing members 28 is part of the hub assembly 60 described further below. In some examples, the biasing members 28 are pre-loaded into the hub assembly 60, as seen in FIG. 16A-16C. The biasing members 28 may be configured to have a length in an expanded state configured to push the shift fork 34 through a full stroke via the cam assembly 12. The pre-loaded biasing members 28 may be slightly compressed. Throughout the present application "expanded" refers to the biasing members 28 in a state of substantial expansion, encompassing the slight compression of a preload. In some examples, the preloaded biasing members may generate 50 or more newtons, 100 or more newtons, 200 or more newtons, or even 250 or more newtons of force. In other examples, the preloaded biasing members may generate greater force or lesser force depending on the application of the actuator system 10. The one or more biasing members 28 are configured to generate substantial force to assist in the alignment and engagement of a dog clutch 102 with a receiving gear 104. In some examples, such as seen in FIGS. 16A and 16B, the biasing members, when compressed, may produce a force of 400 or more newtons, 500 or more newtons, or even 600 or more newtons of force. In other examples, the biasing members 28 may be scaled up or down in force to fit the application such (i.e. more force for a marine vessel propulsion system and less force for a watch mechanism). The biasing members 28 are configured to have an expanded length that corresponds with the distance the shift fork must move to transition between the disengaged position 44 and the engaged position 46. For example, in some passenger car applications, the biasing members 28 may have an expanded length of 5 mm or more, 10 mm or more, or even 15 mm or more, corresponding with the length the shift fork must move a gear between positions. In other examples, the expanded length of the biasing members may be longer or shorter depending on the application of the actuator system 10. The length of biasing members 28 corresponds with the application based on the length of the stroke the shift fork 34 moves between positions 44, 46. The one or more biasing members 28 provide a persistent application force applied through the cam 14 during rotation onto the cam follower 24. As the cam 14 turns, the pressure steadily persists as the cam 14 is rotated, applying pressure corresponding to the exterior profile of the cam 14 contacting the cam follower 24 and the compression of the biasing members 28 when there is a blockage condition.

As the cam 14 is rotated, the contact between the cam profile and the cam follower 24 can be measured as a pressure angle. When the cam 14 is rotated and the profile of the cam (between the first section 78 and the second section 80 of the follower portion 72) transitions, contacting the cam follower 24, the pressure angle is greater than zero. As the cam 14 is rotated to move the shift fork 34 from position to position 44, 46, 48, a distance between the cam follower 24 and the rotational axis RA changes along the contact surface of the cam profile as the cam 14 rotates and interacts with the cam follower 24. For example, the radius of the cam 14 is the shortest when cam 14 is contacting the follower 24 at the first section 78 moving from the disengaged position 44 towards the engaged position 46 through a plurality of intermediate positions 48. As the cam 14 is rotated, changing the contacting portion of the cam 14 from the first section 78 towards the second section 80, the radius from the base circle 70 and the rotational axis RA is increased, and the pressure angle is decreased. As the cam 14 is rotated, the pressure angle changes, applying a consistent force through a combination of the profile of the cam 14 and the biasing members 28. The pressure angle of the force applied onto the cam follower 24 from the distal tip of cam 14 decreases to zero as second section 78 of the follower portion 72 is rotated to a position relatively perpendicular to the biasing members 28 (FIGS. 21B-21C). When the biasing members 28 are compressed and generally perpendicular with the cam follower 24, the pressure angle is the smallest, the cam 14 is using the full radius of the follower portion 72 to transfer force from the biasing members 28 through the cam 14 onto the cam follower 24 through to the shift fork 34. The cam 14 may carrier one or more, two or more, three or more, four or more, or even a plurality of biasing members 28. The one or more biasing members 28 may be any device with elastic properties where the ratio of load to deflection or displacement is substantially a constant. For example, the one or more biasing members 28 are coil springs.

The cam assembly 12 includes a hub assembly 60. The hub assembly 60 functions to assist the actuator system 10 in moving the dog clutch 102 into the receiving gear 104 when a blockage condition is present. The hub assembly 60 functions to move the cam 14 between an expanded state 74 and a compressed 76, depending on the force exerted onto the follower portion 72 of the cam 14. The hub assembly 60 includes a hub housing 62 that extends through an aperture 66 of the cam 14, one or more biasing members 28 disposed within the cam aperture 66 against an interior surface 67 of the cam aperture 66 and in communication with the hub housing 62, and a retainer plate 64. The hub assembly 60 is connected with the gear set 18 so that the hub assembly 60 rotates when the motor 16 is actuated.

Figure 17A:
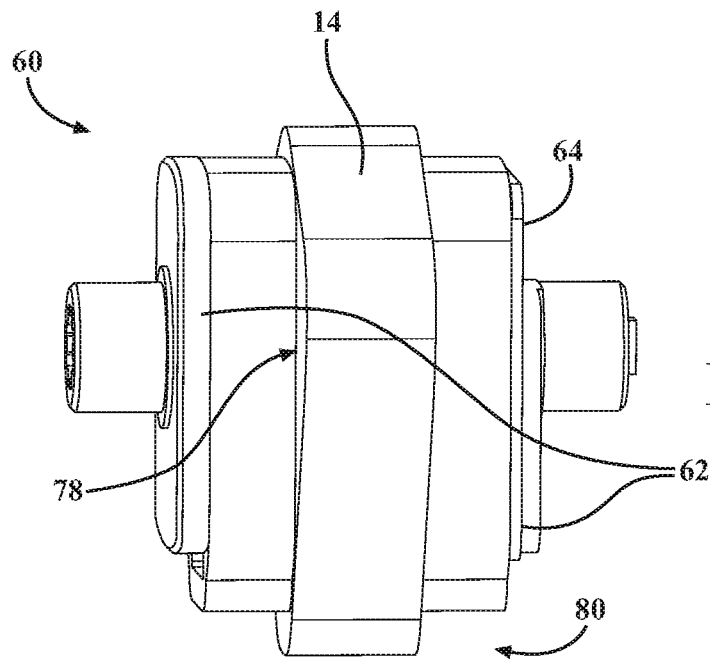
FIGS. 17A and 17B illustrate the hub assembly in a compressed state.
Figure 17B:
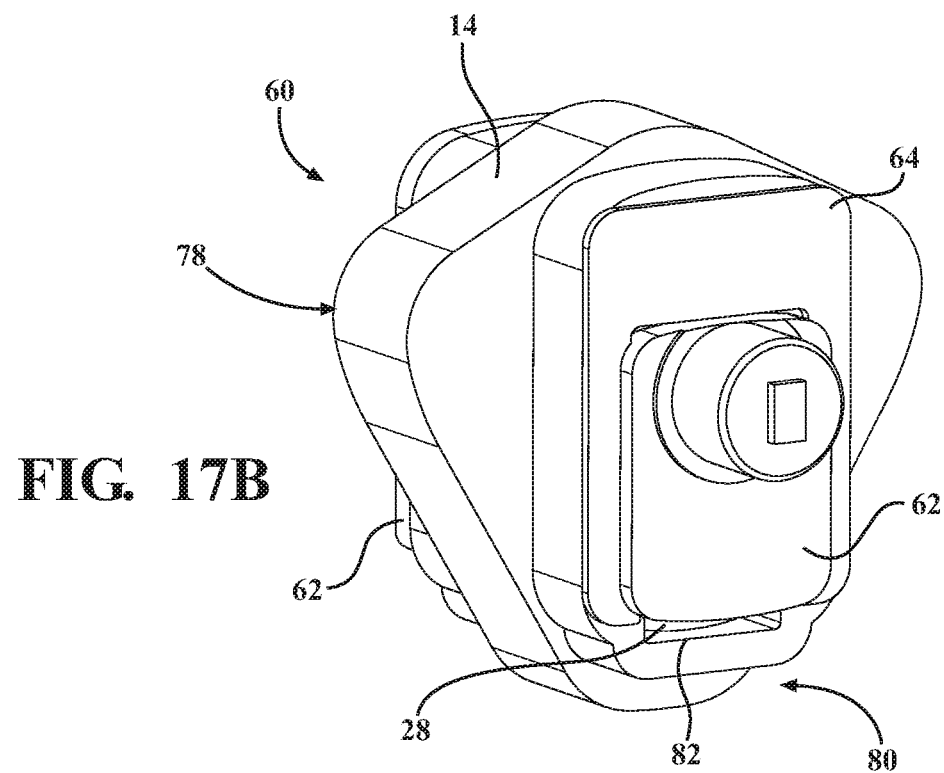
Figure 18:
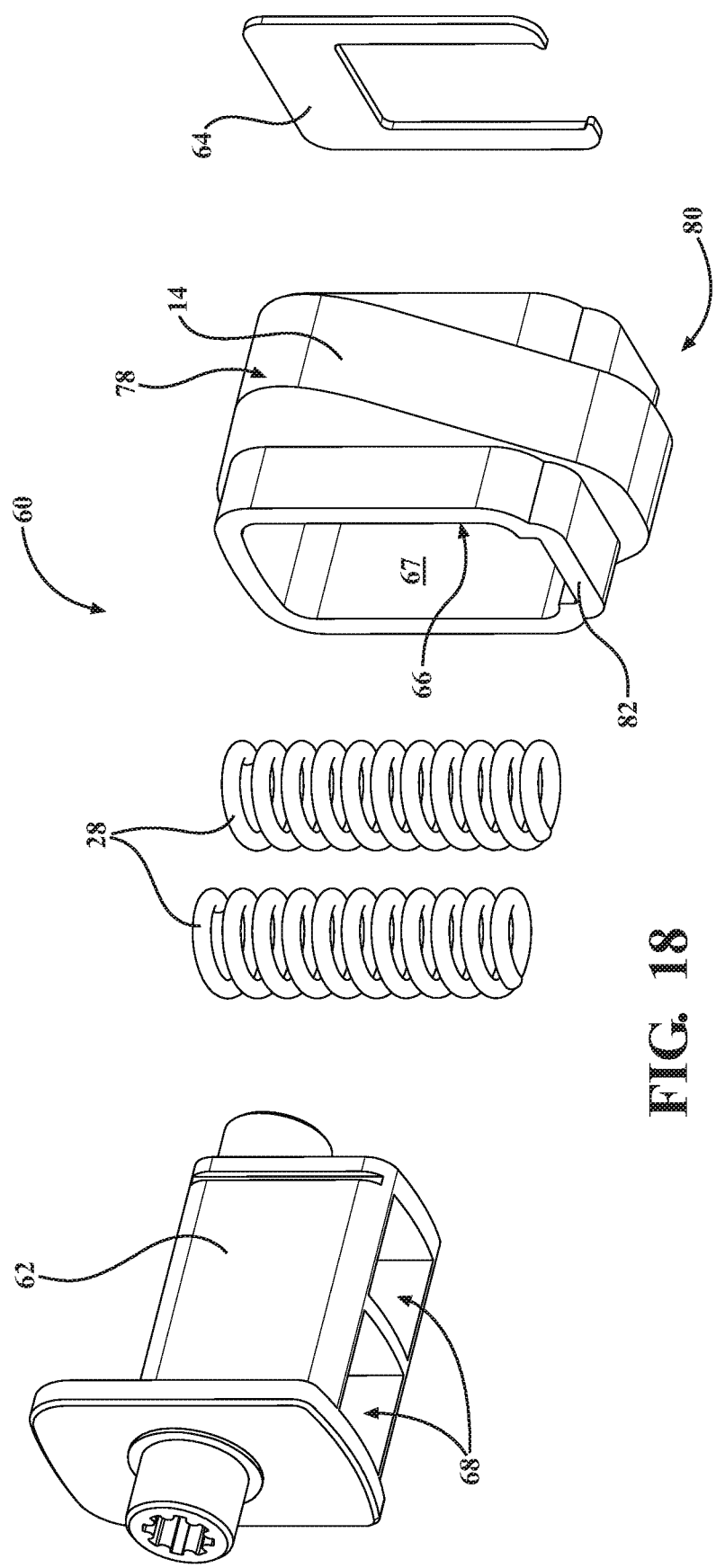
FIG. 18 is an exploded view of the hub assembly.
Figure 20:
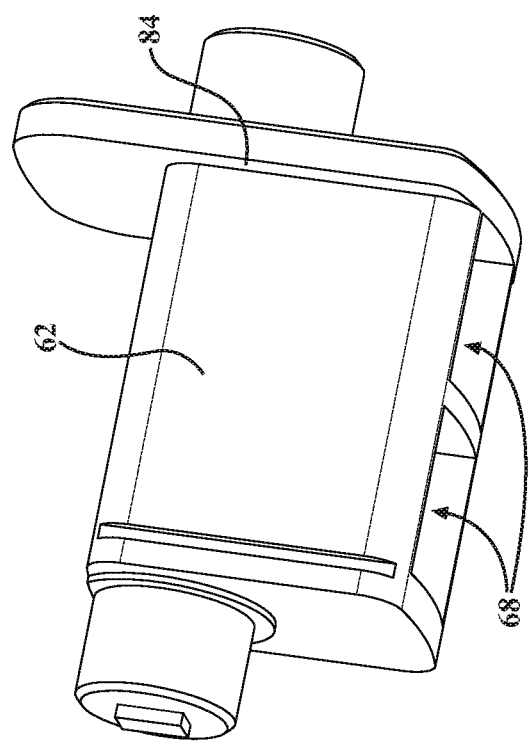
FIG. 20 is a perspective view of the hub.
Figure 19:
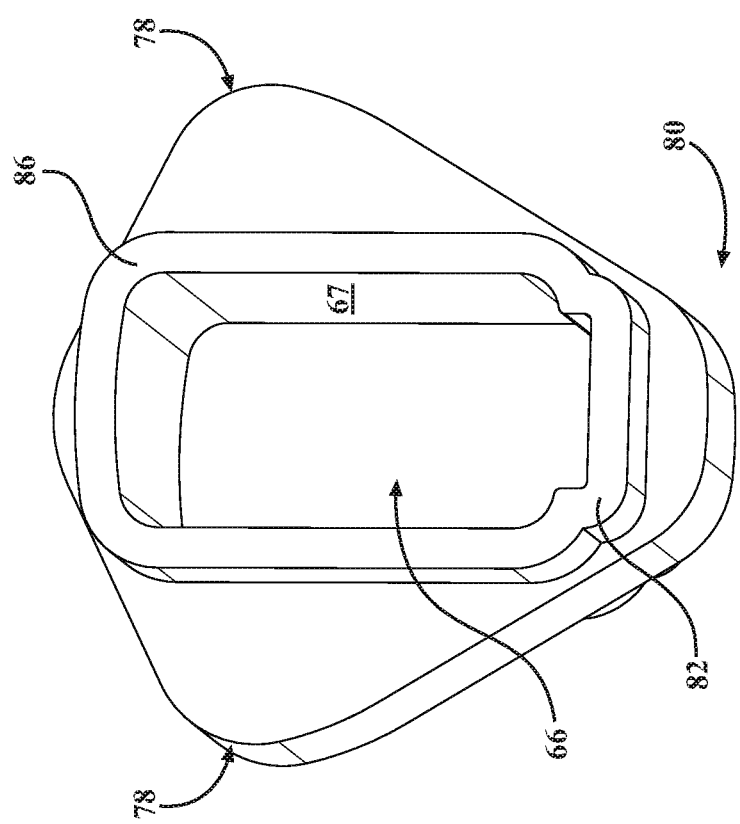
FIG. 19 is a perspective side view of the cam.

FIGS. 16A-16C and FIGS. 17A and 17B illustrate the hub assembly 60 including the cam 14. The hub housing 62 is connected to gear set 18. The hub housing 62 is configured to fit within the aperture 66 of the cam 14 and is keyed to the aperture 66 so that when the gear set 18 is turned, the hub housing 62 causes the cam 14 to turn. The hub housing 62 abuts the cam 14 along contact surfaces 84, 86, providing an axial stop for the cam 14 against the hub housing 62. Similarly, the retainer plate 64 is configured to hold the cam 14 and hub housing 62 in a desired axial relationship. As best seen in FIG. 14 and FIGS. 19-20, the hub housing 62 and an interior surface 67 of the aperture 66 are configured to receive the one or more biasing members 28. The one or more biasing members 28 are positioned within the hub housing 62 at biasing member hub mounts 68 so that the biasing members 28 are pre-loaded between the hub housing 62 and the biasing member cam mounts 82 of the interior surface 67 of the aperture 66. In one example, such as shown in FIGS. 16A-17B, the biasing members 28 are disposed within hub mounts 68 configured as channels to accept the biasing members 28. As can be seen in FIGS. 16A-17B, the hub housing 62 is disposed through the aperture 66 of the cam 14 and configured to allow the cam 14 to be displaced radially along the hub housing 62 when the rotational center of the cam 14 is moved radially away from the rotational axis RA, compressing the one or more biasing members 28 which in turn applies a force onto the follower portion 72 of the cam 14 to move the shift fork 34 and cam assembly 12 from one of the plurality of intermediate positions 48 to an engaged position 46 (corresponding to the shifted position of the cam assembly 12). The cam assembly 12 is transitioned from the neutral position and the shifted position through the plurality of intermediate positions 48. As can be seen in FIGS. 16A-16C, the hub assembly 60 is shown in an expanded state 74, with the cam 14 in an expanded relative to the hub housing 62. When the biasing members 28 are compressed, such as in the intermediate position 48, the cam assembly 12 is in the compressed state 76. The hub assembly 60 is shown in the compressed state in FIGS. 17A and 17B, illustrating that the cam 14 has moved along the hub housing 62 compressing the biasing members 28. The one or more biasing members 28 are compressed between the hub and cam mounts 68, 82 when a blockage condition is present as the cam 14 is rotated, such as seen in FIG. 21B. The cam 14 may turn several degrees before the one or more biasing members 28 begin to compress from the resistive force of a blockage condition. In some examples, the cam may turn about 10 to 15 degrees before the one or more biasing members 28 begin to compress.

The hub assembly 60 functions to assist the shift fork 34 transition between positions 44, 46, and 48, moving the cam 14 between a neutral position corresponding to the disengaged position 44, an intermediate position corresponding with the intermediate position 48, and a shifted position corresponding to the engaged position 46. When there is a dog clutch 102 misalignment causing a blockage condition, the hub assembly 60 applies a force F against the shift fork 34 (FIG. 21B). As can be seen in 21A-21C, the cam assembly 12 and hub assembly 60 work in conjunction with the actuation assembly 22 so that when a blockage condition is present and a resistive force 52 is applied to the distal end of the shift fork 34, the hub assembly 60 translates the force through the shift fork 34 to the cam 14, compressing the one or more biasing members 28 between the follower portion 72 of the cam 14 and the hub housing 62 (FIG. 21B). The compressed biasing members 28 apply a force that is great enough to quickly move the dog clutch 102 into position when the receiving gear 104 and dog clutch 102 are aligned. As noted above, the biasing members 28 are configured with a length long enough to push the cam assembly 12 and actuation assembly 22 through the entire stroke of the shift fork 34.

FIGS. 21A and 22A illustrate the actuation system 10 in a disengaged position 44. The actuator system 10 is in the disengaged position 44 when the shifter fork 34 is in the disengaged position 44 (corresponding to the neutral position) and the cam assembly 12 is in the neutral position. The circular sections 92 are contacting the cam followers 24 on both sides of the cam 14. From the disengaged position 44, the shift fork 34 may be moved to either side, depending on the rotational direction of the cam 14. For example, the distal end of the shift fork 34 is moved to the right when the cam 14 contacts the cam follower 24 on the left side. The hub assembly 60 is shown in the expanded state 74, where the one or more biasing members 28 are expanded.

FIGS. 21B and 22B illustrate the actuator system 10 in an intermediate position 48. The intermediate position 48 occurs when a blockage condition, such as when there is a misalignment between the dog clutch 102 and the receiving gear 104. During a blockage, a resistive force 52 is applied to the distal end of the shift fork 34 when the actuator is moving between the disengaged position 44 and the engaged position 46. The blockage is caused by a momentary misalignment of the dog clutch 102 with the receiving gear 104, so during this misalignment, the shift fork 34 is pressing against dog clutch 102 which is pressing against the receiving gear 104. The force 52 is translated through the shift fork 34 and cam assembly 12, loading a force onto the follower portion 72 of the cam 14 as the cam 14 is rotated. The loaded force (created by the compression of the biasing members 28) is in the opposite direction of the blockage force 52 exerted on the cam assembly 12. When the cam 14 is rotated and the blockage persists, the cam slides radially on the hub, compressing the one or more biasing members 28, storing potential energy, placing the cam assembly 12 in an intermediate position. In some examples, such as shown in FIGS. 21B and 22B, the base circle 70 and first section 78 of the cam 14 is free from contacting the cam followers 24 when the biasing members 28 are compressed in the intermediate position 48, moving the rotational center of the cam away from the rotational axis RA. The stored energy is applied from the follower portion of the cam 14 onto the cam follower 24 and shift fork 34. When the momentary misalignment/blockage is cleared, the stored energy released and translated into a movement force, pushing the shift fork 34 through the stroke into the desired position and moving the actuator system 10 into the engaged position 46 and the cam assembly 12 into the shifted position (see FIG. 21C).

The intermediate position 48 is present going to and from engaged position 46 and the disengaged position 44 in either direction. Once in the engaged position, the biasing members 28 are expanded and are free from exerting force onto the shift fork 34 since the cam 14 is contacting both cam followers 24 at circular sections 70, 90 of the cam 14.

FIGS. 21B and 22B illustrate the intermediate position 48. In the intermediate position 48, the shift fork is still relatively at a center position, however, there is a force being applied by the cam 14 onto the shift fork 34 through the cam follower 24 and actuator bracket 25. The hub assembly 60 is in the compressed state 76, where the one or more biasing members 28 are compressed, placing the cam assembly in the intermediate position. The force is generated by the cam 14 contacting the cam follower 24. As displayed in FIG. 21B, the biasing member 28 is being compressed by the rotation of the cam 14 and the force 52 generated by the misalignment of a dog clutch 102 and receiving gear 104. As the cam 14 is turned, the follower portion 72 of the cam 14 begins to apply force against the cam follower 24, compressing the one or more biasing members 28, applying a movement force F. As the distal tip 90 of the follower portion 72 is moved toward the cam follower 24, the force which is applied to the cam follower 24 is consistently applied as the pressure angle is changed. As the cam 14 is turned, the hub assembly 60 compresses the biasing members 28, moving the rotational center point of the cam 14 away from the rotational axis RA, maintaining the contact area of the cam 14 onto the follower 24 and increasing the alignment force from the follower section 72 to the follower 24. When the tip of the follower section 72 is contacting the cam follower 24, the biasing members 28 of the hub assembly 60 are at their most compressed state, applying substantial force onto the follower 24 and actuator bracket 25 which is multiplied by the length of the actuator bracket 25 and shift fork 34 to produce a torque. The force generated by the hub assembly 60 onto the cam follower 24 and subsequently the actuator bracket 25 and shift fork 34 is used to assist the transitions from disengaged to engaged.

FIGS. 21C and 22C illustrate the actuator system 10 in an engaged position 46. The actuator system 10 is moved into the engaged position 46 when the cam follower 24 is actuated by the cam 14, the cam follower 24 applies a pressure to the top of the shift fork 34 through the actuator bracket 25, moving the proximal end of the shift fork 34 in the direction of the force which simultaneously moves the distal end of the shift fork 34 opposite the direction of the force relative to the pivot axis PA at the pivot coupler 30. The shift fork 34 is moved into the engaged position 46. Similarly, when the actuator system 10 is moved from the engaged position 46 back to the disengaged position 44, the cam 14 actuates the cam follower 24 on the opposite of the engagement position, moving the actuator bracket 25 and shift fork 34 from the engaged position 46 to the disengaged position in the absence of a momentary blockage condition. As can be seen in FIGS. 21A-21C and 22A-22C, in some examples, the rotational axis RA and the pivot axis PA are arranged in a plane of symmetry, aligning the rotational axis RA and the pivot axis PA in a parallel relationship intersecting the same vertical axis. In other configurations, the rotational axis RA and the pivot axis PA may be offset from one another. Once the cam 14 has moved the shift fork 34 into the engaged position 46, the profile of the cam 14 is configured to prevent a potential back-driving of the actuator 10. The base circle 70 and the concentric circular sections 94, 96 of the cam 14 are shaped to prevent the actuator system 10 from being backdriven when the cam assembly 12 is in the neutral and shifted positions. Once the cam 14 is in the engaged position 46, the cam 14 is positioned between the followers 24 such that any force applied to the shift fork may not rotate the cam 14 due to the position of the cam 14 positioned within the actuator bracket 25 relative to the cam followers 24. In one example, the distal tip 90 of the cam 14 is touching one of the cam followers 24 and the base circle 70 is touching the other cam follower 24 such that any force applied by the shift fork 34 through the actuator bracket 25 and cam followers 24 will be directed to the rotational center of the cam 14, preventing the cam from rotating due to the force exerted. FIGS. 21C and 22C show the cam surface at both the base circle 70 and distal tip 90 of the second section 80 are contacting both of the cam followers 24 such that any force applied through the shift fork 34 onto the cam 14 will not substantially rotate the cam assembly 12 and/or back drive the motor 16 because the contact force is directed to the rotational center along the rotational axis RA. Similarly, in the disengaged position 44, the cam profile of the follower portion 72 at the first section 78 is positioned in the actuator bracket 25 relative to the cam followers 24 such that the first section 78 is contacting both cam followers, directing the contact force to the rotational center about the rotational axis RA, such that the shift fork 34 is unable to exert torque onto the cam assembly 12. Further, the hub assembly 60 is designed to only allow the cam to slide along the hub housing 62 in one direction in order to compress the one or more biasing members 28.

The actuator system 10 may include one or more position sensors. In some examples, the actuator system 10 may include a plurality of position sensors. The position sensor may be located on the cam 14, the hub housing 62, the actuator bracket 25, the shift fork 34, the motor 16, the housing 50, a combination thereof, or any location on the actuator system 10. The position sensor may function to sense a blockage condition by monitoring the position of the cam 14, the actuation assembly 22, the one or more biasing members, the like, or a combination thereof. The sensor may function to sense or detect the position of the cam assembly 12, the hub assembly 60, the motor 16, the shift fork 34, the like, or a combination thereof. In one example, the actuation assembly 22 includes a sensor S which determines the position of the cam assembly 12 from the position of magnet M relative to the sensor.

The invention claimed is:
1. An actuator system comprising:
   a support;
   a drive system connected to the support;
   a shift fork operatively connected to the drive system and configured to move a distance defining a stroke length between a disengaged position and an engaged position of one or more gears of a transmission, the shift fork having a cam follower;
   a cam assembly operatively connected with the drive system to move between a neutral position, and a shifted position, with a plurality of intermediate positions between the neutral position and shifted position, the shift fork being in the disengaged position when the cam assembly is in the neutral position, the cam assembly including:
      a cam having an aperture defining an interior surface;
      a hub housing disposed within the aperture of the cam and connected to the drive system; and
      a biasing member disposed within the aperture and preloaded between an interior surface of the aperture of the cam and the hub housing;

wherein the cam moves relative to the hub housing with the biasing member compressing between the hub housing and interior surface of the cam when the cam assembly is rotated through the plurality of intermediate positions and the shift fork remains in the disengaged position due to an interference preventing the shift fork from completing the stroke length; and wherein the cam moves relative to the hub housing with the biasing member expanding to push the cam against the shift fork such the shift fork moves through the stroke length from the disengaged position to the engaged position upon clearance of the interference;

wherein the biasing member is free from exerting force onto the shift fork when the shift fork is in the engaged position.

2. The actuator system of claim 1, wherein the cam assembly applies a consistent torque to the cam follower of the shift fork as a pressure angle is decreased between the cam and the cam follower during movement of the cam relative to the hub housing.

3. The actuator system of claim 2, wherein when the cam assembly is in both the neutral position and the shifted position, the cam contacts the shift fork to prevent the shift fork from backdriving the drive system.

4. The actuator system of claim 3, wherein the cam includes a base portion and a follower portion, the follower portion includes a first section including a pair of curved sections on opposite sides of the follower portion, the curved sections taper into a second section forming a rounded tip at a distal end of the follower portion of the cam.

5. The actuator system of claim 4, wherein both the base portion and the follower portion of the cam in the shifted position contact the shift fork in the engaged position directing forces to a rotational center of the cam, preventing the shift fork from back-driving the drive system.

6. The actuator system of claim 4, wherein the curved sections of the first section of the follower portion in the neutral position contacts the cam follower of the shift fork in the disengaged position directing forces to a rotational center of the cam such that the shift fork is unable to back-drive the cam and the drive system when a force is applied.

7. The actuator system of claim 4, wherein at least a portion of the first section of the follower portion is positioned in the neutral position in contact with the shift fork in the disengaged position so that the shift fork cannot apply a torque onto the cam assembly in the neutral position.

8. The actuator system of claim 7, wherein the cam has a radius that changes along a profile of the cam, the profile of the follower portion changes between the first section and the second section.

9. The actuator system of claim 8, wherein the radius at the first section of the follower portion is a shorter distance from the base than at the second section of the follower portion.

10. The actuator system of claim 9, wherein the pressure angle between the cam and the shift fork decreases as the cam is rotated between the first section and the second section of the follower portion while maintaining a consistent force onto the shift fork.

11. The actuator system of claim 4, wherein the pair of curved sections and the rounded tip of the follower portion are each concentric, the pair of curved sections each forming a protrusion have a first radius and the circular rounded tip has a radius wider than the first radius of the pair of curved sections.

12. The actuator system of claim 4, wherein the first section of the follower portion in one or more of the plurality of the intermediate positions is free from contacting the shift fork when the biasing member is compressed.

13. The actuator system of claim 1, wherein the cam moves radially along the hub housing such that a rotational center of the cam is moved away from an axis of rotation.

14. The actuator system of claim 1, wherein the hub housing and the cam are axially aligned along a longitudinal axis, the hub housing retained within the cam aperture with a retainer plate.

15. The actuator system of claim 1, wherein the biasing member is two biasing members, and the interior surface includes two biasing member mounts and the hub housing includes two biasing member mounts.

16. The actuator system of claim 15, wherein the two biasing members are pre-loaded between the interior surface and the hub housing with at least 50 newtons of force.

17. The actuator system of claim 16, wherein the two biasing members exert a force of at least 400 newtons onto the hub housing and the interior surface of the cam when fully compressed.

18. The actuator system of claim 1, wherein the interior surface of the cam includes a cam mount to accept the biasing member and the hub housing includes a hub mount disposed within the hub housing to accept the biasing member.

19. The actuator system of claim 1, wherein the shift fork is moved about a pivot axis, and the cam rotates about a rotational axis, with the pivot axis and rotational axis intersecting a common axis.

\* \* \* \* \*